(12) United States Patent
Fujita et al.

(10) Patent No.: US 9,874,365 B2
(45) Date of Patent: Jan. 23, 2018

(54) HUMIDITY CONTROL APPARATUS

(75) Inventors: Naotoshi Fujita, Sakai (JP); Shuji Ikegami, Sakai (JP)

(73) Assignee: DAIKIN INDUSTRIES, LTD., Osaka-Shi (JP)

(*) Notice: Subject to any disclaimer, the term of this patent is extended or adjusted under 35 U.S.C. 154(b) by 388 days.

(21) Appl. No.: 14/345,119

(22) PCT Filed: Sep. 14, 2012

(86) PCT No.: PCT/JP2012/005900
§ 371 (c)(1),
(2), (4) Date: Mar. 14, 2014

(87) PCT Pub. No.: WO2013/038707
PCT Pub. Date: Mar. 21, 2013

(65) Prior Publication Data
US 2015/0040766 A1    Feb. 12, 2015

(30) Foreign Application Priority Data
Sep. 16, 2011 (JP) .................................. 2011-203684

(51) Int. Cl.
*F24F 11/00* (2006.01)
*F24F 3/14* (2006.01)
(Continued)

(52) U.S. Cl.
CPC ........ *F24F 11/0008* (2013.01); *F24F 3/1417* (2013.01); *B01D 53/1425* (2013.01); *B01D 53/263* (2013.01); *F24F 2203/026* (2013.01)

(58) Field of Classification Search
CPC ............... F24F 3/1417; F24F 2203/026; F24F 11/0008; B01D 53/1425; B01D 53/263
See application file for complete search history.

(56) References Cited

U.S. PATENT DOCUMENTS 2,557,204 A * 6/1951 Richardson .............. B01D 1/00
                                                                159/4.01
4,164,125 A * 8/1979 Griffiths ................ F24F 3/1417
                                                                 62/238.3
(Continued)

FOREIGN PATENT DOCUMENTS

CN        201811367 U      4/2011
DE        4344099 A1 *     6/1995    ............ F24F 3/1417
(Continued)

OTHER PUBLICATIONS

Sporlan Bulletin 30-20 "3-Way Valves" published Apr. 2007.*
PCT/ISA/210—International Search Report dated Nov. 20, 2012, issued in PCT/JP2012/005900.

*Primary Examiner* — Amber R Orlando
*Assistant Examiner* — Stephen Hobson
(74) *Attorney, Agent, or Firm* — Birch, Stewart, Kolasch & Birch, LLP

(57) ABSTRACT

In the present invention, liquid absorbent is cooled or heated during off-peak hours of electricity demand to prevent the margin between electricity supply and demand from being tightened. A humidity control apparatus switches an absorbent circuit between a regenerated position in which a regeneration circuit is formed, and a humidity-controlled position in which a humidity control circuit is formed. In the regeneration circuit, during a period during which humidity control operation is stopped, outlet and inlet ends of a regeneration passage communicate with each other, and liquid absorbent circulates within the regeneration passage. In the humidity control circuit, during the humidity control operation, a humidity control passage and the regeneration passage communicate with each other, and liquid absorbent circulates between the humidity control passage and the regeneration passage.

18 Claims, 16 Drawing Sheets

(51) Int. Cl.
 *B01D 53/26* (2006.01)
 *B01D 53/14* (2006.01)

(56) References Cited

U.S. PATENT DOCUMENTS

| | | | | |
|---|---|---|---|---|
| 4,259,849 | A * | 4/1981 | Griffiths | B01D 53/26 62/271 |
| 4,815,527 | A * | 3/1989 | Meckler | F24F 3/001 165/50 |
| 4,910,971 | A * | 3/1990 | McNab | F24F 3/044 62/310 |
| 5,070,703 | A * | 12/1991 | Wilkinson | B01D 53/263 62/101 |
| 5,181,387 | A * | 1/1993 | Meckler | F02G 1/043 62/176.1 |
| 5,297,398 | A * | 3/1994 | Meckler | B01D 53/261 62/271 |
| 6,018,954 | A * | 2/2000 | Assaf | F24F 3/1411 62/271 |
| 6,772,534 | B2 * | 8/2004 | Gomes | F24F 3/1411 34/210 |
| 6,887,303 | B2 * | 5/2005 | Hesse | B01D 53/268 95/52 |
| 8,047,511 | B2 * | 11/2011 | Miyauchi | B01D 53/1425 261/151 |
| 2004/0031282 | A1 * | 2/2004 | Kopko | F24F 3/1417 62/271 |
| 2004/0112077 | A1 * | 6/2004 | Forkosh | F24F 3/1417 62/271 |
| 2006/0156761 | A1 * | 7/2006 | Mola | B60H 1/3201 65/333 |
| 2009/0277264 | A1 * | 11/2009 | Forkosh | F24F 3/1417 73/453 |
| 2010/0011794 | A1 * | 1/2010 | De Lima | F01K 13/00 62/235.1 |
| 2010/0090356 | A1 * | 4/2010 | Sines | B01D 53/263 261/29 |
| 2010/0275629 | A1 * | 11/2010 | Erickson | F24F 3/1417 62/271 |
| 2011/0056384 | A1 * | 3/2011 | Kadota | F24F 3/1417 96/407 |
| 2011/0101117 | A1 * | 5/2011 | Miyauchi | B01D 53/1425 236/44 A |
| 2011/0132027 | A1 * | 6/2011 | Gommed | F24F 3/1417 62/477 |
| 2013/0056177 | A1 * | 3/2013 | Coutu | F28D 19/042 165/96 |
| 2013/0199220 | A1 * | 8/2013 | Ma | B01D 53/263 62/91 |
| 2013/0227982 | A1 * | 9/2013 | Forkosh | B01D 53/263 62/271 |
| 2014/0245769 | A1 * | 9/2014 | Vandermeulen | F25B 29/006 62/238.3 |
| 2014/0260367 | A1 * | 9/2014 | Coutu | F24F 3/1417 62/89 |
| 2014/0260369 | A1 * | 9/2014 | LePoudre | F28D 5/02 62/91 |
| 2014/0374929 | A1 * | 12/2014 | Fujita | F28D 21/0015 261/129 |
| 2015/0047382 | A1 * | 2/2015 | Jappen | F24F 5/0035 62/235.1 |
| 2015/0233589 | A1 * | 8/2015 | Betts | F24F 3/147 203/23 |

FOREIGN PATENT DOCUMENTS

| | | | |
|---|---|---|---|
| EP | 2 309 193 A1 | 4/2011 | |
| EP | 2770266 A2 * | 8/2014 | ........... B01D 53/263 |
| JP | 5-146627 A | 6/1993 | |
| JP | 7-108127 A | 4/1995 | |
| JP | 7-328376 A | 12/1995 | |
| JP | 11-37514 A | 2/1999 | |
| JP | 2004-278974 A | 10/2004 | |
| JP | 3785753 B2 * | 6/2006 | |
| JP | 5327372 B2 * | 10/2013 | ........... F24F 3/1417 |
| WO | WO 2011/062808 A1 | 5/2011 | |

* cited by examiner

HUMIDITY CONTROL APPARATUS

TECHNICAL FIELD

The present invention relates to humidity control apparatuses configured to adjust the air humidity using liquid absorbent.

BACKGROUND ART

A humidity control apparatus including liquid absorbent such as an aqueous lithium chloride solution, and moisture permeable membranes through which only water vapor passes and through which the liquid absorbent does not pass has been conventionally known. For example, PATENT DOCUMENT 1 describes a humidity control apparatus that is capable of selecting one of a dehumidification mode or a humidification mode (Paragraphs [0031]-[0033] and FIG. 8 of PATENT DOCUMENT 1). The humidity control apparatus includes an absorbent circuit through which liquid absorbent circulates, and a refrigerant circuit through which refrigerant circulates to perform a refrigeration cycle.

The absorbent circuit includes a moisture absorber and a moisture desorber. The moisture absorber includes an air passage through which air to be supplied into a room flows, and a liquid passage through which liquid absorbent flows. The air passage and the liquid passage are separated by a moisture permeable membrane. In contrast, the moisture desorber includes an air passage through which air to be discharged to outside the room flows, and a liquid passage through which liquid absorbent flows. The air passage and the liquid passage are separated by a moisture permeable membrane.

The absorbent circuit includes a passage extending from the moisture absorber to the moisture desorber and connected to a heater, and a passage extending from the moisture desorber to the moisture absorber and including a cooler.

When the humidity control apparatus is operated in a dehumidification mode, liquid absorbent cooled by the cooler flows into the moisture absorber. In the moisture absorber, moisture in target air is absorbed by the liquid absorbent to dehumidify the target air. In this case, the concentration of the liquid absorbent is reduced by the amount of moisture absorbed. The dehumidified target air is supplied into the room.

In contrast, the liquid absorbent that has absorbed the moisture in the moisture absorber is heated by the heater, and then flows into the moisture desorber. In the moisture desorber, the moisture in the liquid absorbent is released into regeneration air to humidify the regeneration air. In this case, the concentration of the liquid absorbent is increased by the amount of the moisture released, and the liquid absorbent is therefore regenerated. The humidified regeneration air is discharged to outside the room.

The liquid absorbent from which the moisture has been released in the moisture desorber is again cooled by the cooler, and then flows into the moisture absorber. As such, the humidity control apparatus dehumidifies the room such that while the liquid absorbent repeatedly absorbs and desorbs moisture, the liquid absorbent circulates through the absorbent circuit.

CITATION LIST

Patent Document

PATENT DOCUMENT 1: Japanese Unexamined Patent Publication No. H05-146627

SUMMARY OF THE INVENTION

Technical Problem

However, a conventional humidity control apparatus always performs cooling of liquid absorbent in the moisture absorption operation and heating of liquid absorbent in the moisture desorption operation at the same time. Consequently, when the conventional humidity control apparatus is operated in a dehumidification mode during peak hours of electricity demand each day, this leads to a tight margin between electricity supply and demand.

It is therefore an object of the present invention to cool or heat liquid absorbent during off-peak hours of electricity demand to prevent the margin between electricity supply and demand from being tightened.

Solution to the Problem

A first aspect of the invention is directed to a humidity control apparatus for performing humidity control operation in which target air is humidified using liquid absorbent. The humidity control apparatus of the first aspect of the invention includes: an absorbent circuit (1) through which the liquid absorbent circulates and which includes a humidity controller (40a) configured to control a humidity of the target air by exchanging moisture between the target air and the liquid absorbent, and a regenerator (40b) configured to regenerate the liquid absorbent by exchanging moisture between regeneration air and the liquid absorbent; a regeneration heat exchanger section (46b) provided in the absorbent circuit (1) to cool or heat the liquid absorbent exchanging moisture with the regeneration air; and a circuit selector (4) provided in the absorbent circuit (1) to switch the absorbent circuit (1) to a regenerated position in which the liquid absorbent flows through the regenerator (40b) and the regeneration heat exchanger section (46b) to allow only regeneration operation for regenerating the liquid absorbent during a period during which the humidity control operation is stopped.

In the first aspect of the invention, during the period during which the humidity control operation is stopped, the absorbent circuit (1) is switched to the regenerated position, and only the regeneration operation is performed. During the humidity control operation, liquid absorbent regenerated in the regeneration operation is circulated through the absorbent circuit (1).

Since the humidity control operation is performed using the liquid absorbent regenerated in the regeneration operation, the energy consumed in the humidity control operation is reduced, and the electricity demand during peak hours of electricity demand is reduced. In addition, regeneration operation is performed during off-peak hours of electricity demand to achieve a so-called peak shift.

Here, during the period during which the humidity control operation is stopped, only the regeneration heat exchanger section (46b) exchanges heat, thereby reducing the consumed energy.

According to a second aspect of the invention, in the first aspect of the invention, the absorbent circuit (1) may include a humidity control heat exchanger section (46a) configured to heat or cool the liquid absorbent exchanging moisture with the target air, the absorbent circuit (1) may include a humidity control passage (2) in which while the humidity control heat exchanger section (46a) heats the liquid absorbent, and in the humidity controller (40a), moisture is released from the liquid absorbent to the target air, the humidity control heat exchanger section (46a) cools the liquid absorbent, and in the humidity controller (40a), the liquid absorbent absorbs moisture from the target air, and a regeneration passage (3) in which while the regeneration heat exchanger section (46b) cools the liquid absorbent, and in the regenerator (40b), the liquid absorbent absorbs moisture from the regeneration air, the regeneration heat exchanger section (46b) heats the liquid absorbent, and in the regenerator (40b), moisture is released from the liquid absorbent to the regeneration air, and the circuit selector (4) may switch the absorbent circuit (1) between a humidity-controlled position in which during the humidity control operation, the liquid absorbent circulates between the humidity control passage (2) and the regeneration passage (3), and a regenerated position in which during the regeneration operation during which the humidity control operation is stopped, both ends of the regeneration passage (3) communicate with each other, and the liquid absorbent circulates within the regeneration passage (3) to allow only regeneration of the liquid absorbent.

In the second aspect of the invention, in the humidity control operation, liquid absorbent circulates between the humidity control passage (2) and the regeneration passage (3), and in the regeneration operation, both ends of the regeneration passage (3) communicate with each other, and liquid absorbent circulates within the regeneration passage (3) to allow only regeneration of liquid absorbent.

According to a third aspect of the invention, in the first aspect of the invention, the absorbent circuit (1) may include a humidity control passage (2) in which while moisture is released from the liquid absorbent to the target air in the humidity controller (40a), the liquid absorbent absorbs moisture from the target air in the humidity controller (40a), a regeneration passage (3) in which while the regeneration heat exchanger section (46b) cools the liquid absorbent, and in the regenerator (40b), the liquid absorbent absorbs moisture from the regeneration air, the regeneration heat exchanger section (46b) heats the liquid absorbent, and in the regenerator (40b), moisture is released from the liquid absorbent to the regeneration air, and a liquid tank (7) configured to store the liquid absorbent, and the circuit selector (4) may switch the absorbent circuit (1) between a humidity-controlled position in which during the humidity control operation, the liquid absorbent circulates between the humidity control passage (2) and the liquid tank (7), and a regenerated position in which during the regeneration operation during which the humidity control operation is stopped, the liquid absorbent circulates between the regeneration passage (3) and the liquid tank (7) to allow only regeneration of the liquid absorbent.

In the third aspect of the invention, liquid absorbent regenerated in the regeneration operation is stored in the liquid tank (7). In the humidity control operation, the regenerated liquid absorbent in the liquid tank (7) is circulated between the humidity control passage (2) and the liquid tank (7).

According to a fourth aspect of the invention, in the third aspect of the invention, the absorbent circuit (1) may include a humidity control heat exchanger section (46a) configured to heat or cool the liquid absorbent exchanging moisture with the target air. The humidity control passage (2) may be configured such that while the humidity control heat exchanger section (46a) heats the liquid absorbent, and in the humidity controller (40a), moisture is released from the liquid absorbent to the target air, the humidity control heat exchanger section (46a) cools the liquid absorbent, and in the humidity controller (40a), the liquid absorbent absorbs moisture from the target air. The humidity-controlled position of the absorbent circuit (1) may include a first humidity-controlled position in which the liquid absorbent circulates between the humidity control passage (2) and the regeneration passage (3), and the liquid absorbent is heated and cooled to perform the humidity control operation, and a second humidity-controlled position in which the liquid absorbent circulates between the humidity control passage (2) and the liquid tank (7), and the humidity control operation is performed without heating or cooling the liquid absorbent.

In the fourth aspect of the invention, in the humidity control operation, any one of the first humidity-controlled position or the second humidity-controlled position is selected. In the first humidity-controlled position, liquid absorbent circulates between the humidity control passage (2) and the regeneration passage (3), and the liquid absorbent is heated and cooled to perform humidity control operation. In the second humidity-controlled position, liquid absorbent circulates between the humidity control passage (2) and the liquid tank (7), and humidity control operation is performed without heating or cooling the liquid absorbent.

According to a fifth aspect of the invention, in the first aspect of the invention, the regeneration passage (3) may include a liquid tank (7) configured to store the liquid absorbent.

In the fifth aspect of the invention, in the regeneration operation, a larger amount of regenerated liquid absorbent can be stored in the liquid tank (7). In the humidity control operation, the humidity of air to be humidity-controlled is controlled using the liquid absorbent in the liquid tank (7).

According to a sixth aspect of the invention, in the fifth aspect of the invention, the regeneration passage (3) may include a bypass passage (5a) used to bypass the liquid tank (7).

In the sixth aspect of the invention, the provision of the bypass passage (5a) allows the amount of liquid absorbent flowing out of the liquid tank (7) to be adjusted depending on the humidity control load. If the humidity control load decreases, opening the bypass passage (5a) decreases the amount of liquid absorbent flowing out of the liquid tank (7). This reduces the humidity control capacity. In contrast, if the humidity control load increases, closing the bypass passage (5a) increases the amount of liquid absorbent flowing out of the liquid tank (7). This increases the humidity control capacity.

According to a seventh aspect of the invention, the humidity control apparatus of any one of the second, and fourth through sixth aspects of the invention may further include: a refrigerant circuit (35) in which refrigerant circulates among a compressor (36), the humidity control heat exchanger section (46a), the regeneration heat exchanger section (46b), and an auxiliary heat exchanger section (43) to perform a refrigeration cycle, the refrigerant passing through the humidity control heat exchanger section (46a) and the regeneration heat exchanger section (46b) exchanges heat with the liquid absorbent, and the refrigerant passing through the auxiliary heat exchanger section (43) exchanges heat with heat source fluid. The refrigerant circuit (35) may include a refrigerant selector (37) that is selectable between a first position in which when the circuit selector (4) is in the humidity-controlled position, one of the regeneration heat exchanger section (46b) or the humidity control heat exchanger section (46a) functions as a radiator, and the other one thereof functions as an evaporator, and a second position in which when the circuit selector (4) is in the regenerated position, one of the regeneration heat exchanger section (46b) or the auxiliary heat exchanger section (43) functions as a radiator, and the other one thereof functions as an evaporator.

In the seventh aspect of the invention, when the refrigerant circuit (35) is in the humidity-controlled position, one of the regeneration heat exchanger section (46b) or the humidity control heat exchanger section (46a) functions as a radiator, the other one thereof functions as an evaporator, and a refrigeration cycle is performed in the refrigerant circuit (35).

In contrast, when the refrigerant circuit (35) is in the regenerated position, the humidity control heat exchanger section (46a) does not work. Instead of the humidity control heat exchanger section (46a), the auxiliary heat exchanger section (43) is used. One of the regeneration heat exchanger section (46b) or the auxiliary heat exchanger section (43) functions as a radiator, the other one thereof functions as an evaporator, and a refrigeration cycle is performed in the refrigerant circuit (35).

According to an eighth aspect of the invention, in the seventh aspect of the invention, the heat source fluid in the auxiliary heat exchanger section (43) may be air, and the humidity control apparatus may further include a fan (28) configured to deliver air to both of the regenerator (40b) and the auxiliary heat exchanger section (43).

In the eighth aspect of the invention, air is supplied through the single fan (28) to both of the regenerator (40b) and the auxiliary heat exchanger section (43).

According to a ninth aspect of the invention, the humidity control apparatus of any one of the first through eighth aspects of the invention may further include: a concentration detector (8b) configured to detect a concentration of the liquid absorbent when the absorbent circuit (1) is in a regenerated position; and a controller (8) configured to stop the regeneration operation based on a value detected by the concentration detector (8b).

In the ninth aspect of the invention, for example, in a situation where the concentration of liquid absorbent is increased in the regeneration operation, when the concentration is greater than or equal to a predetermined value, circulation of liquid absorbent through the regeneration passage (3) is stopped. In a situation where the concentration of liquid absorbent is decreased in the regeneration operation, when the concentration is less than or equal to a predetermined value, circulation of liquid absorbent through the regeneration passage (3) is stopped.

According to a tenth aspect of the invention, in the ninth aspect of the invention, the concentration detector (8b) may detect the concentration of the liquid absorbent based on a level of the liquid absorbent in the liquid tank (7).

In the tenth aspect of the invention, for example, when the concentration of liquid absorbent is increased in the regeneration operation, moisture in the liquid absorbent is released to regeneration air. Thus, with increasing concentration, the liquid level in the liquid tank (7) is lowered. When the concentration of liquid absorbent is decreased in the regeneration operation, the liquid absorbent absorbs moisture in the regeneration air. Thus, with decreasing concentration, the liquid level in the liquid tank (7) is raised. Utilizing such a relationship between the concentration of the liquid absorbent and the liquid level in the liquid tank (7) enables the detection of the concentration of the liquid absorbent based on the liquid level in the liquid tank (7).

According to an eleventh aspect of the invention, the humidity control apparatus of any one of the first through eighth aspects of the invention may further include: a moisture amount detector (8a) configured to detect a total amount of moisture released from or absorbed by the liquid absorbent in the regenerator (40b) when the circuit selector (4) is in a regenerated position; and a controller (8) configured to stop the regeneration operation based on a value detected by the moisture amount detector (8a).

In the eleventh aspect of the invention, for example, in a situation where the concentration of liquid absorbent is increased in the regeneration operation, when the total amount of moisture released to the regeneration air in the regenerator (40b) is greater than a predetermined value during the regeneration operation, it is determined that the concentration of the liquid absorbent has been increased to a predetermined concentration, and the regeneration operation is stopped. In a situation where the concentration of liquid absorbent is decreased in the regeneration operation, when the total amount of moisture absorbed from the regeneration air in the regenerator (40b) is greater than a predetermined value during the regeneration operation, it is determined that the concentration of the liquid absorbent has been decreased to a predetermined concentration, and the regeneration operation is stopped.

According to a twelfth aspect of the invention, the humidity control apparatus of the sixth aspect of the invention may further include: a tank selector (5b) that is selectable between a tank utilization position in which the bypass passage (5a) is closed, and the liquid tank (7) is opened, and a bypass position in which the bypass passage (5a) is opened, and the liquid tank (7) is closed; a feeder (36) configured to feed heat source fluid exchanging heat with the liquid absorbent to the humidity control heat exchanger section (46a); an adjuster (33) configured to adjust a capacity of the feeder (36), the adjuster (33) increasing an amount of the heat source fluid fed in a situation where a humidity control capacity of the humidity controller (40a) is not high enough to correspond to a humidity control load for the target air, and decreasing the amount of the heat source fluid fed in a situation where the humidity control capacity of the humidity controller (40a) is excessively high for the humidity control load for the target air; and a controller (8) configured to switch the tank selector (5b) from the bypass position to the tank utilization position in a situation where the capacity of the feeder (36) is greater than or equal to a first value, and switch the tank selector (5b) from the tank utilization position to the bypass position in a situation where the capacity of the feeder (36) is less than or equal to a second value less than the first value.

In the twelfth aspect of the invention, the humidity control capacity of the liquid absorbent varies depending on the amount of heat removed from the liquid absorbent and the amount of heat added to the liquid absorbent. Thus, changing the capacity of the feeder (36) in the adjuster (33) increases or decreases the amount of heat source fluid fed to the humidity control heat exchanger section (46a), and the humidity control capacity is adjusted to correspond to the humidity control load.

Here, when the humidity control capacity is not high enough to correspond to the humidity control load, the capacity of the feeder (36) increases, and when the humidity control capacity is excessively high for the humidity control load, the capacity of the feeder (36) decreases. In other words, it is estimated that with increasing capacity of the feeder (36), the humidity control load tends to increase, and with decreasing capacity of the feeder (36), the humidity control load tends to decrease.

Based on the foregoing estimation, when the capacity of the feeder (36) is greater than or equal to the first value, it is determined that the humidity control load tends to be high. In this case, the bypass passage (5a) is closed, and the liquid tank (7) is opened. Thus, regenerated liquid absorbent flows out of the liquid tank (7), and the concentration of liquid absorbent flowing through the humidity control passage (2) varies, resulting in the increased humidity control capacity. When the capacity of the feeder (36) is less than or equal to the second value, it is determined that the humidity control load tends to be low. In this case, the bypass passage (5a) is opened, and the liquid tank (7) is closed. As such, when the humidity control load tends to be high, the liquid tank (7) is opened.

According to a thirteenth aspect of the invention, the humidity control apparatus of the fourth aspect of the invention may further include: a controller (8) configured to allow the humidity control heat exchanger section (46a) and the regeneration heat exchanger section (46b) to stop exchanging heat in the second humidity-controlled position.

In the thirteenth aspect of the invention, adequately regenerated liquid absorbent is stored in the liquid tank (7) under the regenerated position, and the stored liquid absorbent is utilized to perform humidity control operation. As a result, during the humidity control operation, liquid absorbent circulates between the humidity control passage (2) and the liquid tank (7), and exchanging heat in each of the humidity control heat exchanger section (46a) and the regeneration heat exchanger section (46b) is stopped.

Advantages of the Invention

According to the present invention, liquid absorbent is regenerated during the period during which the humidity control operation is stopped, and the regenerated liquid absorbent is used to perform humidity control operation. This can reduce the energy consumed in the humidity control operation. As a result, the energy consumed in the humidity control operation during peak hours of electricity demand can be reduced. Thus, a so-called peak shift can be achieved, and the margin between electricity supply and demand can be prevented from being tightened.

Regeneration operation can be performed by utilizing midnight power. This can reduce the electricity rate, thereby achieving greater economy.

According to the second aspect of the invention, the energy for cooling and heating liquid absorbent in the humidity control operation can be reduced, thereby ensuring a so-called peak shift.

According to the third aspect of the invention, regenerated liquid absorbent in the liquid tank (7) is utilized in the humidity control operation. This enables the omission of cooling or heating of liquid absorbent in the humidity control operation, enables a so-called peak shift, and can ensure that the margin between electricity supply and demand is prevented from being tightened.

According to the fourth aspect of the invention, humidity control operation in which liquid absorbent is cooled or heated, and humidity control operation in which liquid absorbent is not cooled or heated can be selectively performed. Thus, operation can be performed to correspond to the humidity control load.

According to the fifth aspect of the invention, a larger amount of regenerated liquid absorbent can be stored in the liquid tank (7) during the regeneration operation. In the humidity control operation, the liquid absorbent is drained from the liquid tank (7), and thus, can be circulated through the humidity control circuit. Thus, in the humidity control operation, a larger amount of liquid absorbent is circulated through the humidity control circuit, thereby reducing the energy consumed in the humidity control operation.

According to the sixth aspect of the invention, in the humidity control operation, the bypass passage (5a) is switched between its open position and its closed position in response to the humidity control load, thereby adjusting the humidity control capacity.

According to the seventh aspect of the invention, the provision of the auxiliary heat exchanger section (43) and the refrigerant selector (37) allows liquid absorbent to be cooled or heated through the refrigeration cycle. Thus, liquid absorbent can be regenerated by low-load operation. This can reduce the energy consumed in the regeneration operation, thereby improving energy saving performance.

According to the eighth aspect of the invention, air can be delivered to both of the regeneration module (40b) and the auxiliary heat exchanger section (43) with the single fan (28) without providing both of a fan for the regeneration module (40b) and a fan for the auxiliary heat exchanger section (43). This can reduce the number of fans (28).

According to the ninth aspect of the invention, the circulation of liquid absorbent can be stopped based on the concentration of liquid absorbent circulating through the regeneration passage (3). This allows the concentration of liquid absorbent to be appropriate at the end of the regeneration operation.

According to the tenth aspect of the invention, the concentration of the liquid absorbent can be detected based on the liquid level in the liquid tank (7). This allows the concentration of the liquid absorbent to be more easily detected than when the concentration of the liquid absorbent is directly sensed.

According to the eleventh aspect of the invention, the circulation of liquid absorbent can be stopped based on the total amount of moisture released from or absorbed by the liquid absorbent in the regenerator (40b) during the regeneration operation. This allows the concentration of liquid absorbent to be appropriate at the end of the regeneration operation, and furthermore can prevent the regeneration operation from being performed for a longer time than required.

According to the twelfth aspect of the invention, when the humidity control load tends to be high, the liquid tank (7) can be opened, and a larger amount of liquid absorbent than required can be prevented from flowing out of the liquid tank (7).

According to the thirteenth aspect of the invention, in the humidity control operation, exchanging heat not only in the regeneration heat exchanger section (46b) but also in the humidity control heat exchanger section (46a) can be stopped. This can reduce the energy consumed in the humidity control operation.

DESCRIPTION OF EMBODIMENTS

Embodiments of the present invention will be described in detail hereinafter with reference to the drawings. The following embodiments are merely preferred examples in nature, and are not intended to limit the scope, applications, and use of the disclosure.

First Embodiment of the Invention

Figure 1:
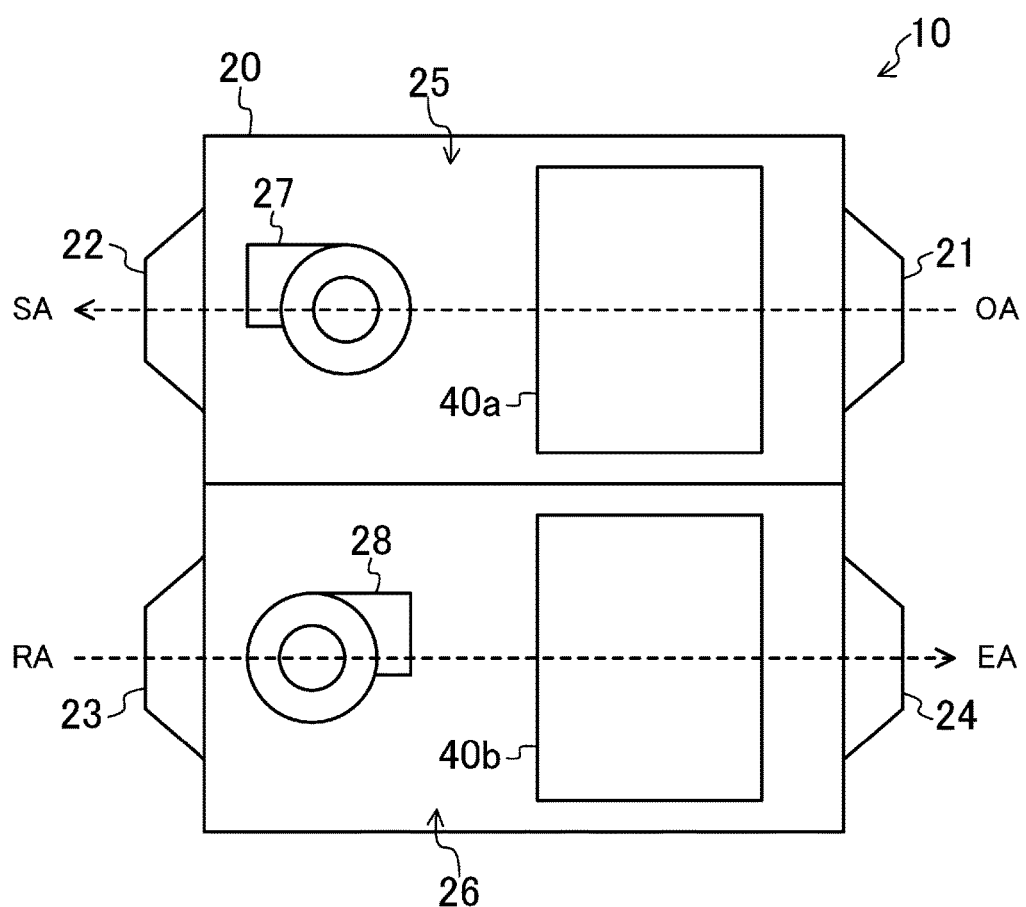
FIG. 1 is a plan view schematically illustrating the structure of a humidity control apparatus.
Figure 2:
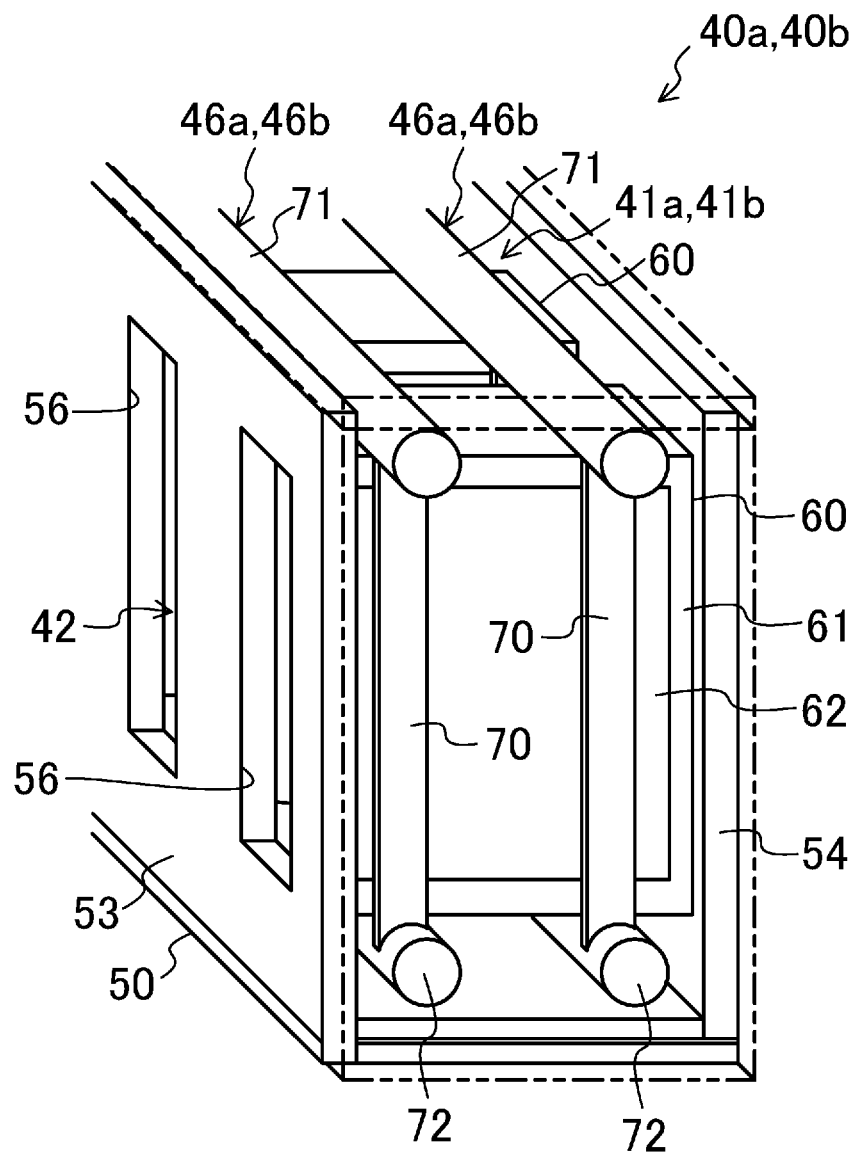
FIG. 2 is a schematic perspective view illustrating a humidity control module and a regeneration module, which are partially omitted.
Figure 3:
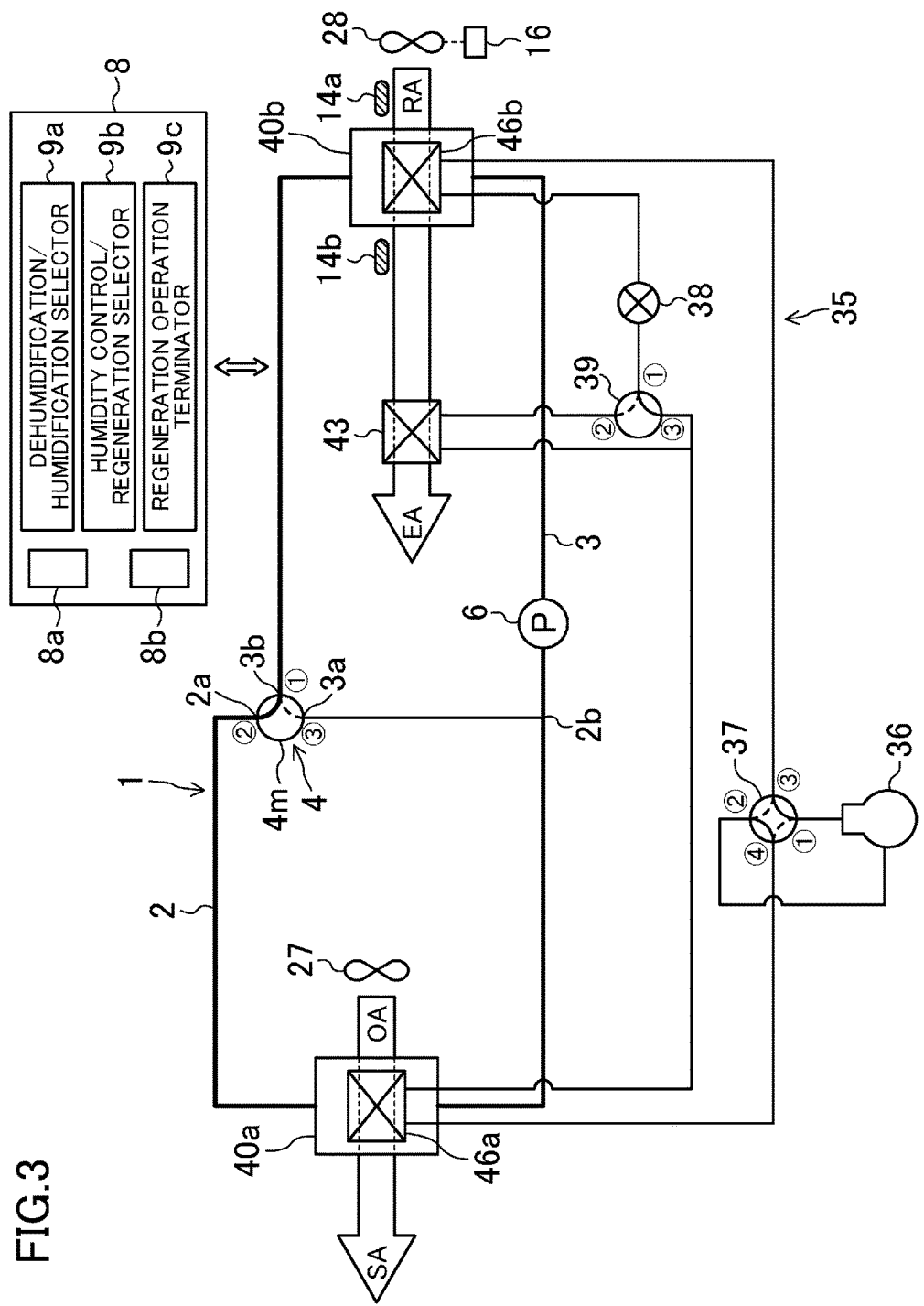
FIG. 3 is a circuit diagram of a humidity control apparatus of a first embodiment.

As illustrated in FIGS. 1-3, a humidity control apparatus (10) of a first embodiment controls the humidity of target air using liquid absorbent to control the humidity of room air. Humidity control operation in which the humidity of the target air is controlled includes a dehumidification mode in which the target air is dehumidified, and a humidification mode in which the target air is humidified. The humidity control apparatus (10) is capable of selectively performing the dehumidification mode and the humidification mode, and is configured to perform regeneration operation in which the liquid absorbent is regenerated during the period during which the humidity control operation, i.e., the dehumidification mode or the humidification mode, is stopped.

<Configuration of Humidity Control Apparatus>

The humidity control apparatus (10) includes a casing (20). An absorbent circuit (1), a refrigerant circuit (35), a humidity control fan (27), and a regeneration fan (28) are housed in the casing (20).

—Casing—

As illustrated in FIG. 1, the casing (20) has a rectangular parallelepiped box shape. One end surface of the casing (20) has an outside-air inlet (21) and an exhaust opening (24), and the other end surface thereof has a room-air inlet (23) and an air supply opening (22). The interior space of the casing (20) is partitioned into a humidity control passage (25) and a regeneration passage (26). The humidity control passage (25) communicates with the outside-air inlet (21) and the air supply opening (22). The humidity control passage (25) includes the humidity control fan (27) and a humidity control module (40a).

In contrast, the regeneration passage (26) communicates with the room-air inlet (23) and the exhaust opening (24). The regeneration passage (26) includes the regeneration fan (28) and a regeneration module (40b).

Note that target air flows through the humidity control passage (25), and regeneration air flows through the regeneration passage (26).

—Humidity Control Module and Regeneration Module—

The humidity control module (40a) forms a humidity controller, and is configured to control the air humidity using liquid absorbent. The regeneration module (40b) forms a regenerator, and is configured to regenerate the liquid absorbent. As illustrated in FIG. 2, the humidity control module (40a) includes a plurality of inner members (60), an outer case (50), and a heat transfer member (46a) that is a humidity control heat exchanger section. The regeneration module (40b) is configured in a manner similar to that of the humidity control module (40a), and includes a plurality of inner members (60), an outer case (50), and a heat transfer member (46b) that is a regeneration heat exchanger section as illustrated in FIG. 2.

The inner members (60) each has a hollow rectangular parallelepiped shape both ends of which are open. The inner members (60) each include a support frame (61), and moisture permeable membranes (62) covering side surfaces of the support frame (61). The moisture permeable membranes (62) are membranes through which water vapor passes and through which liquid absorbent does not pass. Examples of the moisture permeable membranes (62) can include a hydrophobic porous membrane made of fluoroplastics, such as PTFE.

The outer case (50) has a hollow rectangular parallelepiped shape, and includes side plates (53, 54) having a plurality of vents (56). The inner members (60) equal in number to the vents (56) are housed in the outer case (50). The inner members (60) are aligned in a row along the longitudinal direction of the outer case (50) such that the moisture permeable membranes (62) covering the adjacent side surfaces of each adjacent pair of the inner members (60) face each other. The inner members (60) are fixed to the outer case (50) such that their openings (63) each overlap a corresponding one of the vents (56) of the side plates (53, 54).

The interior space of each of the inner members (60) communicates with the outside through corresponding ones of the vents (56) of the outer case (50), and forms an air passage (42) through which air flows. Air flowing through the humidity control passage (25) or the regeneration passage (26) of the humidity control apparatus (10) circulates through the air passage (42).

A portion of the interior space of the humidity control module (40*a*) located outside the corresponding inner members (60) and inside the corresponding outer case (50) forms an absorbent passage (41*a*) through which liquid absorbent flows, and a portion of the interior space of the regeneration module (40*b*) located outside the corresponding inner members (60) and inside the corresponding outer case (50) forms an absorbent passage (41*b*) through which liquid absorbent flows. Liquid absorbent circulating through the absorbent circuit (1) circulates through the absorbent passages (41*a*, 41*b*). Thus, the moisture permeable membranes (62) each have a front surface in contact with air flowing through the air passage (42), and a back surface in contact with the liquid absorbent flowing through the absorbent circuit (1).

The heat transfer members (46*a*, 46*b*) each include a plurality of heat transfer tubes (70), a first header (71), and a second header (72). The heat transfer tubes (70) each form a perforated flat tube the interior space of which is partitioned into a plurality of channels. The heat transfer tubes (70) are arranged in a row while being spaced a fixed distance apart from each other such that their flat surfaces face each other. The first header (71) is joined to upper ends of the heat transfer tubes (70) arranged in a row, and the second header (72) is joined to lower ends of the heat transfer tubes (70) arranged in a row.

In the outer case (50), one of the heat transfer tubes (70) of each of the heat transfer members (46*a*, 46*b*) is placed between each adjacent pair of the inner members (60), and the heat transfer tubes (70) each have a surface in contact with liquid absorbent flowing through a corresponding one of the absorbent passages (41*a*, 41*b*).

—Refrigerant Circuit—

As illustrated in FIG. 3, the refrigerant circuit (35) is a closed circuit including a compressor (36), a four-way valve (37), an expansion valve (38), a refrigerant three-way valve (39), the heat transfer member (46*a*) of the humidity control module (40*a*), the heat transfer member (46*b*) of the regeneration module (40*b*), and an auxiliary heat exchanger (43) that are connected together. Refrigerant that is heat source fluid serving to exchange heat with liquid absorbent circulates through the refrigerant circuit (35).

Here, the auxiliary heat exchanger (43) forms an auxiliary heat exchanger, and is, for example, a cross-fin type fin-and-tube heat exchanger. The auxiliary heat exchanger (43) is placed at a location along the flow of regeneration air formed by the regeneration fan (28). The auxiliary heat exchanger (43) is configured to exchange heat between the regeneration air and refrigerant using the regeneration air from the regeneration fan (28) as heat source fluid.

The compressor (36) forms a feeder (36) configured to feed refrigerant serving as heat source fluid to the heat transfer member (46*a*) of the humidity control module (40*a*). A discharge side of the compressor (36) is connected to a first port of the four-way valve (37), and a suction side of the compressor (36) is connected to a second port of the four-way valve (37).

In the refrigerant circuit (35), the heat transfer member (46*b*) of the regeneration module (40*b*), the expansion valve (38), the refrigerant three-way valve (39), the auxiliary heat exchanger (43), and the heat transfer member (46*a*) of the humidity control module (40*a*) are placed between third and fourth ports of the four-way valve (37). Refrigerant sealed in the refrigerant circuit (35) is circulated through the refrigerant circuit (35) to perform a vapor compression refrigeration cycle. Thus, the refrigerant circuit (35) feeds refrigerant serving as a heating medium to the heat transfer member (46*a*) of the humidity control module (40*a*), the heat transfer member (46*b*) of the regeneration module (40*b*), and the auxiliary heat exchanger (43).

The four-way valve (37) forms a refrigerant selector that allows selection between an air-dehumidified position in which air is dehumidified (the position shown by the solid line in FIG. 3) and an air-humidified position in which air is humidified (the position shown by the broken line therein). The first port of the four-way valve (37) in the air-dehumidified position communicates with the third port thereof, and the second port thereof communicates with the fourth port thereof. In contrast, the first port of the four-way valve (37) in the air-humidified position communicates with the fourth port thereof, and the second port thereof communicates with the third port thereof.

The refrigerant three-way valve (39) allows selection between a humidity-controlled position in which the air humidity is controlled (the position shown by the solid line in FIG. 3) and a regenerated position in which liquid absorbent is regenerated (the position shown by the broken line therein). A first port of the refrigerant three-way valve (39) in the humidity-controlled position communicates with a third port thereof, and a second port thereof is closed. In contrast, the first port of the refrigerant three-way valve (39) in the regenerated position communicates with the second port thereof, and the third port thereof is closed.

—Absorbent Circuit—

The absorbent circuit (1) includes a humidity control passage (2), a regeneration passage (3), and a liquid three-way valve (4*m*). The liquid three-way valve (4*m*) forms a circuit selector (4) of the absorbent circuit (1). The humidity control passage (2) includes the humidity control module (40*a*). The regeneration passage (3) includes a liquid pump (6) and the regeneration module (40*b*).

The liquid three-way valve (4*m*) allows selection between the regenerated position (the position shown by the broken line in FIG. 3) and the humidity-controlled position (the position shown by the solid line therein). A first port of the liquid three-way valve (4*m*) in the regenerated position communicates with a third port thereof, and a second port thereof is closed. In contrast, the first port of the liquid three-way valve (4*m*) in the humidity-controlled position communicates with the second port thereof, and the third port thereof is closed.

The first port of the liquid three-way valve (4*m*) is connected to an outlet end (3*b*) of the regeneration passage (3), the second port of the liquid three-way valve (4*m*) is connected to an inlet end (2*a*) of the humidity control passage (2), and the third port of the liquid three-way valve (4*m*) is connected to an inlet end (3*a*) of the regeneration passage (3). An outlet end (2*b*) of the humidity control passage (2) communicates with a portion of the regeneration passage (3) between the liquid pump (6) and the third port of the liquid three-way valve (4*m*).

When the liquid three-way valve (4*m*) is in the regenerated position, the inlet end (3*a*) and the outlet end (3*b*) of the regeneration passage (3) communicates with each other to form a regeneration circuit in the absorbent circuit (1). When the liquid three-way valve (4*m*) is in the humidity-controlled position, the humidity control passage (2) and the regeneration passage (3) communicates with each other to form a humidity control circuit in the absorbent circuit (1).

—Controller—

The humidity control apparatus (10) is provided with a controller (8) configured to control operation of the humidity control apparatus (10). The controller (8) includes a dehumidification/humidification selector (9a), a humidity control/regeneration selector (9b), and a regeneration operation terminator (9c).

The controller (8) is electrically connected to temperature/humidity sensors (14a, 14b) configured to sense the temperature and humidity of air passing through the regeneration module (40b), and a rotational speed sensor (16) configured to sense the rotational speed of the regeneration fan (28). The temperature/humidity sensors (14a, 14b) are respectively provided near the inlet and outlet of the air passage (42) of the regeneration module (40b).

The dehumidification/humidification selector (9a) is configured to switch operation of the humidity control apparatus (10) between a dehumidification mode and a humidification mode under an instruction from a user or the controller (8). When a signal for setting the humidity control apparatus (10) into the dehumidification mode is fed to the dehumidification/humidification selector (9a), the dehumidification/humidification selector (9a) outputs, to the four-way valve (37), a signal for switching the position of the four-way valve (37) to the air-dehumidified position, and when a signal for setting the humidity control apparatus (10) into the humidification mode is fed to the dehumidification/humidification selector (9a), the dehumidification/humidification selector (9a) outputs, to the four-way valve (37) of the refrigerant circuit (35), a signal for switching the position of the four-way valve (37) to the air-humidified position.

The humidity control/regeneration selector (9b) switches the operating status of the humidity control apparatus (10) between humidity control operation and regeneration operation. The regeneration operation is performed during the period during which the humidity control operation is stopped. When a signal for stopping the humidity control operation of the humidity control apparatus (10) is fed to the humidity control/regeneration selector (9b), the humidity control/regeneration selector (9b) switches each of the liquid and refrigerant three-way valves (4m, 39) from the humidity-controlled position to the regenerated position. When a signal for starting the humidity control operation of the humidity control apparatus (10) is fed to the humidity control/regeneration selector (9b), the humidity control/regeneration selector (9b) switches each of the liquid three-way valve (4m) and the refrigerant three-way valve (39) from the regenerated position to the humidity-controlled position.

Under the regeneration operation, the absolute humidity of regeneration air near the inlet of the regeneration module (40b) and the absolute humidity of regeneration air near the outlet of the regeneration module (40b) are fed from the temperature/humidity sensors (14a, 14b) to the regeneration operation terminator (9c). The rotational speed of the regeneration fan (28) is fed from the rotational speed sensor (16) to the regeneration operation terminator (9c).

The controller (8) includes a moisture amount detector (8a) and a concentration detector (8b).

The moisture amount detector (8a) calculates the total amount of moisture absorbed in the regeneration module (40b) based on the difference between the absolute humidity of the inlet-side regeneration air and that of the outlet-side regeneration air that are sensed by the temperature/humidity sensors (14a, 14b), and the total amount of regeneration air determined by the rotational speed of the regeneration fan (28) sensed by the rotational speed sensor (16).

The concentration detector (8b) calculates the concentration of liquid absorbent based on the total amount of moisture calculated by the moisture amount detector (8a), the (initial) weight of liquid absorbent charged into the absorbent circuit (1), and the (initial) concentration of liquid absorbent charged into the absorbent circuit (1).

The regeneration operation terminator (9c) detects the concentration of liquid absorbent in the humidity-control-side liquid circuit (12) during the regeneration operation of the humidity control apparatus (10), based on the values sensed by the temperature/humidity sensors (14a, 14b) and the rotational speed sensor (16), and when the detected concentration reaches a predetermined value, the regeneration operation terminator (9c) outputs a stop signal to the liquid pump (6) and the compressor (36).

Specifically, when the concentration detected by the concentration detector (8b) reaches a predetermined value, the regeneration operation terminator (9c) outputs a stop signal to the liquid pump (6) and the compressor (36) to stop the regeneration operation.

<Operational Behavior of Humidity Control Apparatus>

Next, the operational behavior of the humidity control apparatus (10) will be described. First, the dehumidification mode and regeneration operation during the period during which the dehumidification mode is stopped will be described, and the humidification mode and regeneration operation during the period during which the humidification mode is stopped will be next described.

—Dehumidification Mode—

In the dehumidification mode, taken outside air (target air) (OA) is dehumidified, and is then supplied, as supply air (SA), into a room, moisture is given to taken room air (regeneration air) (RA), and the room air to which the moisture has been given is then discharged, as ejection air (EA), to outside the room.

Specifically, the dehumidification/humidification selector (9a) of the controller (8) places the four-way valve (37) in the air-dehumidified position. The humidity control/regeneration selector (9b) places the liquid and refrigerant three-way valves (4m, 39) in the humidity-controlled position (see FIG. 4). Thereafter, the humidity control fan (27), the regeneration fan (28), the compressor (36), and the liquid pump (6) start working, and the degree of opening of the expansion valve (38) is appropriately adjusted.

The actuation of the compressor (36) allows refrigerant to circulate through the compressor (36), the heat transfer member (46b) of the regeneration module (40b), the expansion valve (38), and the heat transfer member (46a) of the humidity control module (40a) sequentially, and a refrigeration cycle is performed in the refrigerant circuit (35). Since the refrigerant three-way valve (39) is in the humidity-controlled position, and the second port of the three-way valve (39) is thus closed, refrigerant does not circulate through the auxiliary heat exchanger (43).

Consequently, the heat transfer member (46a) of the humidity control module (40a) functions as an evaporator to allow the humidity control module (40a) to function as a moisture absorber, and the heat transfer member (46b) of the regeneration module (40b) functions as a condenser to allow the regeneration module (40b) to function as a moisture desorber.

Figure 4:
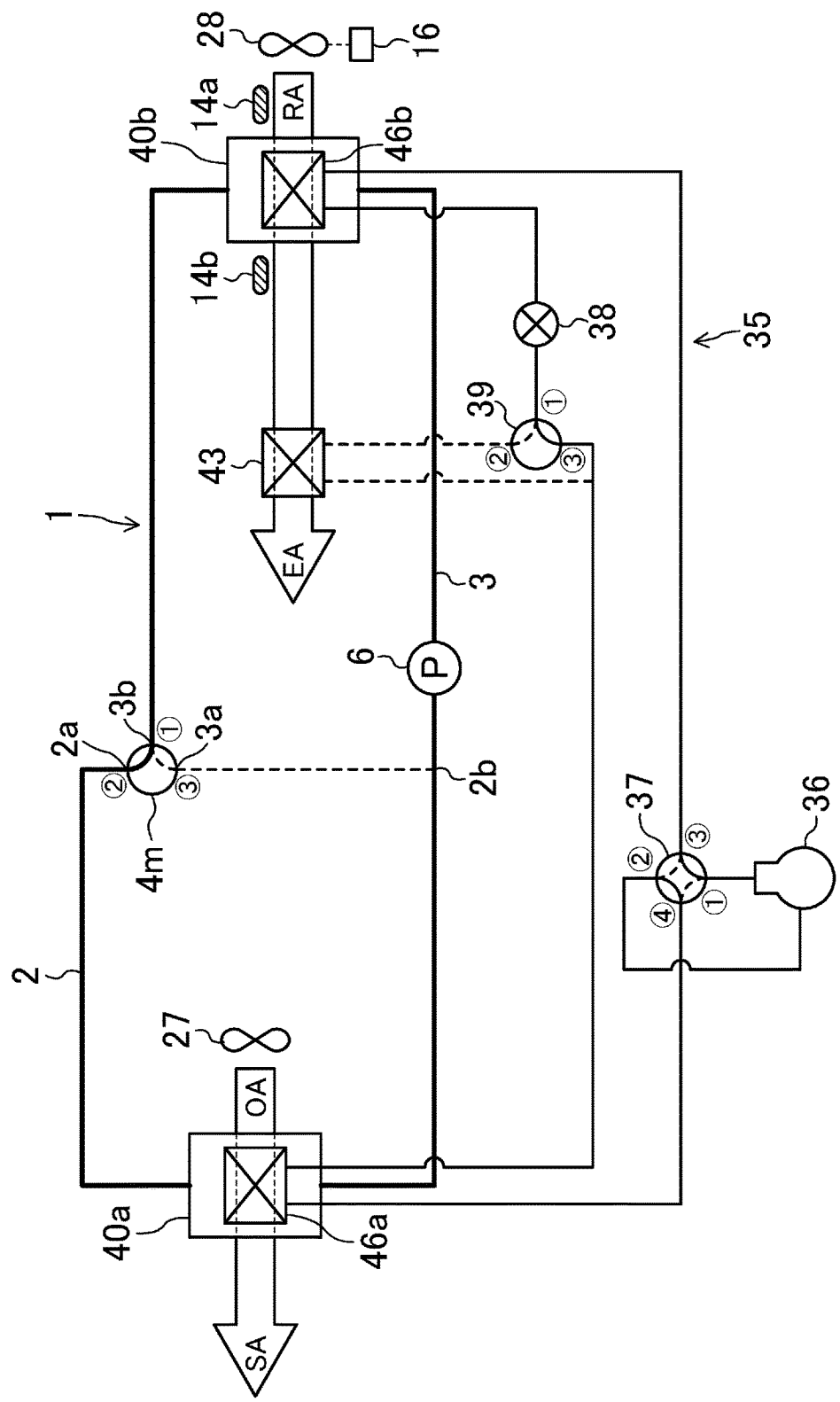
FIG. 4 is a circuit diagram of the humidity control apparatus of the first embodiment in a dehumidification mode.

The actuation of the liquid pump (6) allows liquid absorbent to circulate between the humidity control passage (2) and the regeneration passage (3) in the absorbent circuit (1) as illustrated in FIG. 4.

Liquid absorbent discharged from the liquid pump (6) flows into the absorbent passage (41b) of the regeneration module (40b). The liquid absorbent that has flowed into the absorbent passage (41b) is heated by refrigerant flowing through the heat transfer member (46b). Regeneration air flows through the air passage (42) of the regeneration module (40b). In the regeneration module (40b), part of water contained in the liquid absorbent changes into water vapor, and the water vapor passes through the moisture permeable membrane (62), and is given to the regeneration air flowing through the air passage (42). The water vapor given to the regeneration air is discharged to outside the room together with the regeneration air.

As such, in the regeneration module (40b), part of water contained in the liquid absorbent flowing through the absorbent passage (41b) passes through the moisture permeable membrane (62), and is given to the regeneration air. Thus, in the regeneration module (40b), while the liquid absorbent passes through the absorbent passage (41b), the concentration of the liquid absorbent gradually increases.

The high-concentration liquid absorbent that has flowed out of the regeneration module (40b) flows into the absorbent passage (41a) of the humidity control module (40a). The liquid absorbent that has flowed into the absorbent passage (41a) is cooled by refrigerant flowing through the heat transfer member (46a). Target air flows through the air passage (42) of the humidity control module (40a). In the humidity control module (40a), water vapor contained in the target air passes through the moisture permeable membrane (62), and is absorbed by the liquid absorbent flowing through the absorbent passage (41a). Thereafter, the target air dehumidified during the passage of the target air through the air passage (42) of the humidity control module (40a) is supplied into the room.

As such, in the humidity control module (40a), part of the water vapor contained in the target air flowing through the air passage (42) passes through the moisture permeable membrane (62), and is absorbed by the liquid absorbent. Thus, in the humidity control module (40a), while the liquid absorbent passes through the absorbent passage (41a), the concentration of the liquid absorbent gradually decreases. The low-concentration liquid absorbent that has flowed out of the humidity control module (40a) is sucked into the liquid pump (6), and is again delivered toward the regeneration module (40b).

—Regeneration Operation During Period During which Dehumidification Mode is Stopped—

In the regeneration operation, the concentration of liquid absorbent in the absorbent circuit (1) is increased until the dehumidification mode is again started.

Specifically, the dehumidification/humidification selector (9a) of the controller (8) places the four-way valve (37) in the air-dehumidified position. The humidity control/regeneration selector (9b) places each of the liquid and refrigerant three-way valves (4m, 39) in the regenerated position (see FIG. 5). Thereafter, the regeneration fan (28), the compressor (36), and the liquid pump (6) start working, and the degree of opening of the expansion valve (38) is appropriately adjusted. Note that the humidity control fan (27) is at rest.

The actuation of the compressor (36) allows refrigerant to circulate through the compressor (36), the heat transfer member (46b) of the regeneration module (40b), the expansion valve (38), the auxiliary heat exchanger (43), and the heat transfer member (46a) of the humidity control module (40a) sequentially, and a refrigeration cycle is performed in the refrigerant circuit (35). Since, as described above, the humidity control fan (27) is at rest, refrigerant merely passes through the heat transfer member (46a) of the humidity control module (40a), and the heat transfer member (46a) does not exchange heat.

Consequently, the heat transfer member (46b) of the regeneration module (40b) functions as a condenser to allow the regeneration module (40b) to function as a moisture desorber. Furthermore, the auxiliary heat exchanger (43) functions as an evaporator.

Figure 5:
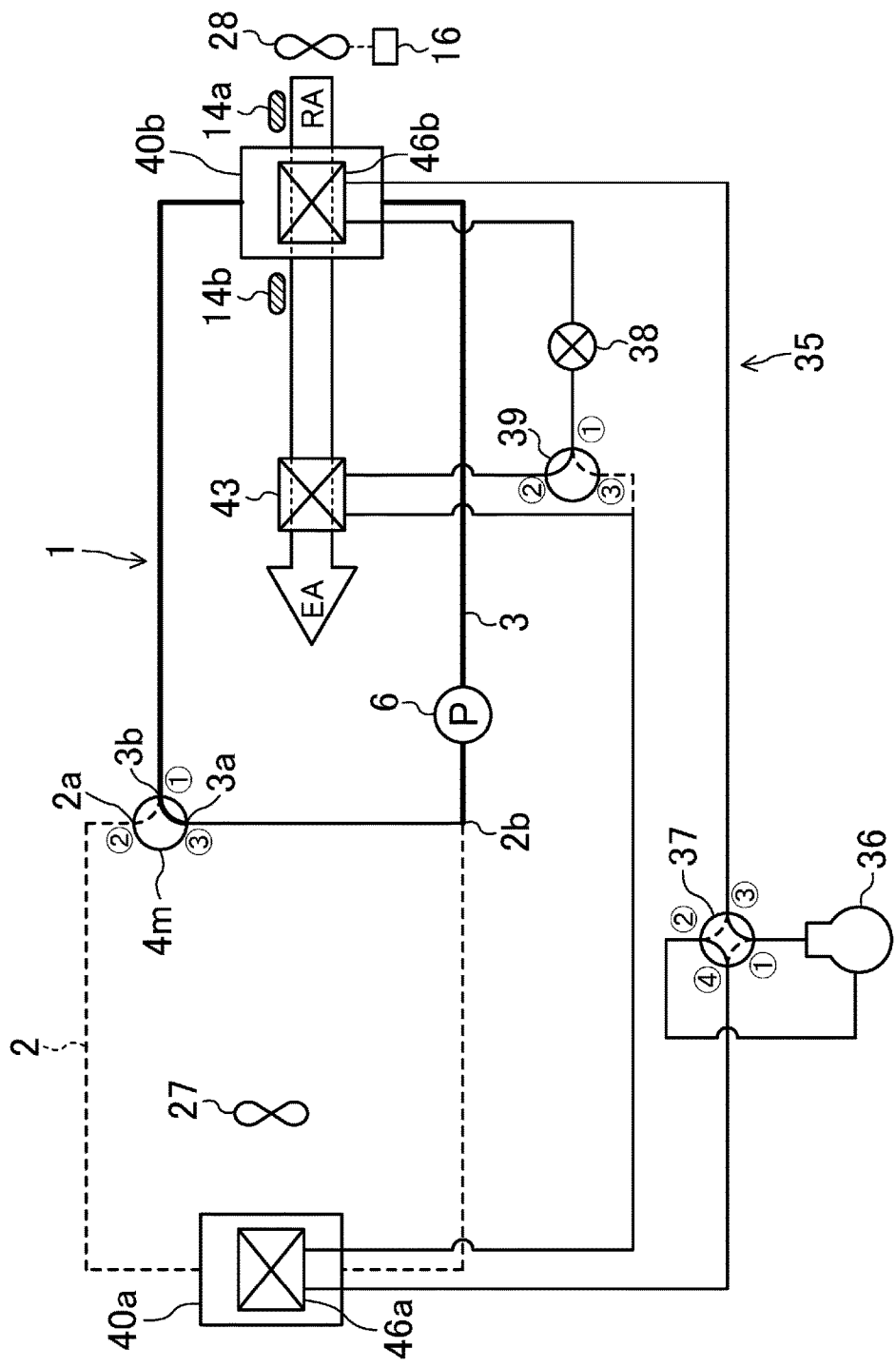
FIG. 5 is a circuit diagram of the humidity control apparatus of the first embodiment under regeneration operation during the period during which the dehumidification mode is stopped.

The actuation of the liquid pump (6) allows liquid absorbent to circulate through the regeneration passage (3) in the absorbent circuit (1) as illustrated in FIG. 5. In this case, liquid absorbent does not flow to the humidity control passage (2).

Liquid absorbent discharged from the liquid pump (6) flows into the absorbent passage (41b) of the regeneration module (40b). In this case, operation of the regeneration module (40b) is identical with that in the above-described dehumidification mode, and thus, the explanation thereof is omitted. Then, the high-concentration liquid absorbent that has flowed out of the regeneration module (40b) passes through the liquid three-way valve (4m), and is sucked into the liquid pump (6). Thereafter, the sucked liquid absorbent is again discharged toward the regeneration module (40b).

In the foregoing manner, the concentration of liquid absorbent circulating through the regeneration passage (3) increases. When the regeneration operation terminator (9c) detects that the concentration has reached a predetermined concentration, the regeneration operation terminator (9c) outputs a stop signal to stop the liquid pump (6) and the compressor (36). Thus, the regeneration operation terminates.

—Humidification Mode—

In the humidification mode, taken outside air (target air) (OA) is humidified, and is then supplied, as supply air (SA), into a room, moisture in taken room air (regeneration air) (RA) is absorbed, and the room air from which the moisture has been absorbed is then discharged, as ejection air (EA), to outside the room.

Specifically, the dehumidification/humidification selector (9a) of the controller (8) places the four-way valve (37) in the air-humidified position. The humidity control/regeneration selector (9b) places each of the liquid and refrigerant three-way valves (4m, 39) in the humidity-controlled position (see FIG. 6). Thereafter, the humidity control fan (27), the regeneration fan (28), the compressor (36), and the liquid pump (6) start working, and the degree of opening of the expansion valve (38) is appropriately adjusted.

The actuation of the compressor (36) allows refrigerant to circulate through the compressor (36), the heat transfer member (46a) of the humidity control module (40a), the expansion valve (38), and the heat transfer member (46b) of the regeneration module (40b) sequentially, and a refrigeration cycle is performed in the refrigerant circuit (35). Since the refrigerant three-way valve (39) is in the humidity-controlled position, and the second port of the three-way valve (39) is thus closed, refrigerant does not circulate through the auxiliary heat exchanger (43).

Consequently, the heat transfer member (46a) of the humidity control module (40a) functions as a condenser to allow the humidity control module (40a) to function as a moisture desorber, and the heat transfer member (46b) of the regeneration module (40b) functions as an evaporator to allow the regeneration module (40b) to function as a moisture absorber.

Figure 6:
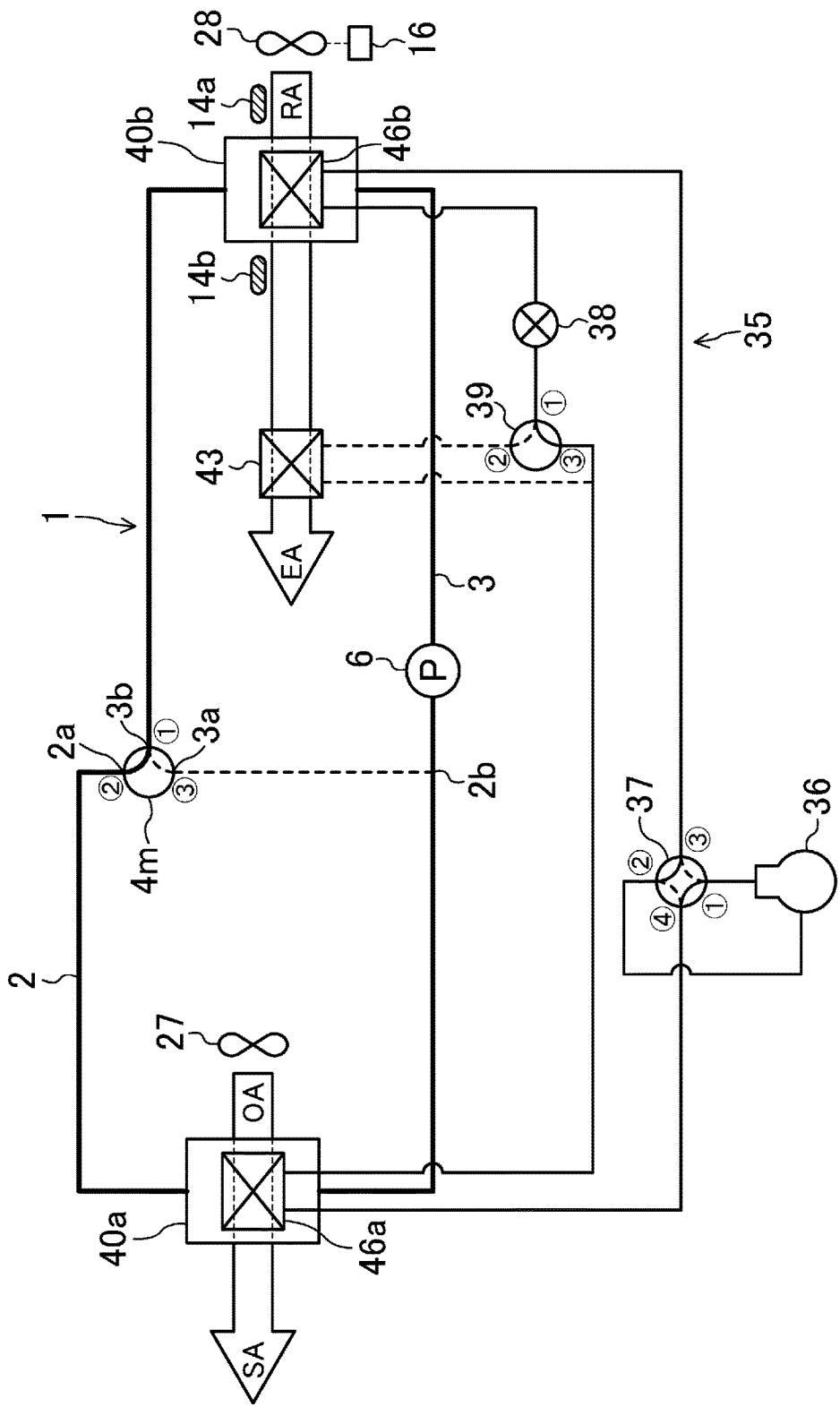
FIG. 6 is a circuit diagram of the humidity control apparatus of the first embodiment in a humidification mode.

The actuation of the liquid pump (6) allows liquid absorbent to circulate between the humidity control passage (2) and the regeneration passage (3) in the absorbent circuit (1) as illustrated in FIG. 6.

Liquid absorbent discharged from the liquid pump (6) flows into the absorbent passage (41b) of the regeneration module (40*b*). The liquid absorbent that has flowed into the absorbent passage (41*b*) is cooled by refrigerant flowing through the heat transfer member (46*b*). Regeneration air flows through the air passage (42) of the regeneration module (40*b*). In the regeneration module (40*b*), water vapor contained in the regeneration air passes through the moisture permeable membrane (62), and is absorbed by the liquid absorbent flowing through the absorbent passage (41*b*). The regeneration air from which the water vapor is removed is discharged to outside the room later.

In the regeneration module (40*b*), part of the water vapor contained in the regeneration air flowing through the air passage (42) passes through the moisture permeable membrane (62), and is absorbed by liquid absorbent. Consequently, in the regeneration module (40*b*), while the liquid absorbent passes through the absorbent passage (41*b*), the concentration of liquid absorbent gradually decreases.

The low-concentration liquid absorbent that has flowed out of the regeneration module (40*b*) flows into the absorbent passage (41*a*) of the humidity control module (40*a*). The liquid absorbent that has flowed into the absorbent passage (41*a*) is heated by refrigerant flowing through the heat transfer member (46*a*). Target air flows through the air passage (42) of the humidity control module (40*a*). In the humidity control module (40*a*), part of water contained in the liquid absorbent changes into water vapor, and the water vapor passes through the moisture permeable membrane (62), and is given to the target air flowing through the air passage (42). Thereafter, the target air humidified during the passage of the target air through the air passage (42) of the humidity control module (40*a*) is supplied into the room.

As such, in the humidity control module (40*a*), part of the water contained in the liquid absorbent flowing through the absorbent passage (41*a*) passes through the moisture permeable membrane (62), and the target air is humidified. Thus, in the humidity control module (40*a*), while the liquid absorbent passes through the absorbent passage (41*a*), the concentration of the liquid absorbent gradually increases. The high-concentration liquid absorbent that has flowed out of the humidity control module (40*a*) is sucked into the liquid pump (6), and is again delivered toward the regeneration module (40*b*).

—Regeneration Operation During Period During which Humidification Mode is Stopped—

In the regeneration operation, the concentration of liquid absorbent in the absorbent circuit (1) is decreased until the humidification mode is again started.

Specifically, the dehumidification/humidification selector (9*a*) of the controller (8) places the four-way valve (37) in the air-humidified position. The humidity control/regeneration selector (9*b*) places each of the liquid and refrigerant three-way valves (4*m*, 39) in the regenerated position (see FIG. 7). Thereafter, the regeneration fan (28), the compressor (36), and the liquid pump (6) start working, and the degree of opening of the expansion valve (38) is appropriately adjusted. Note that the humidity control fan (27) is at rest.

The actuation of the compressor (36) allows refrigerant to circulate through the compressor (36), the heat transfer member (46*a*) of the humidity control module (40*a*), the auxiliary heat exchanger (43), the expansion valve (38), and the heat transfer member (46*b*) of the regeneration module (40*b*) sequentially, and a refrigeration cycle is performed in the refrigerant circuit (35). Since, as described above, the humidity control fan (27) is at rest, refrigerant merely passes through the heat transfer member (46*a*) of the humidity control module (40*a*), and the heat transfer member (46*a*) does not exchange heat.

Consequently, the heat transfer member (46*b*) of the regeneration module (40*b*) functions as an evaporator to allow the regeneration module (40*b*) to function as a moisture absorber. Furthermore, the auxiliary heat exchanger (43) functions as a condenser.

Figure 7:
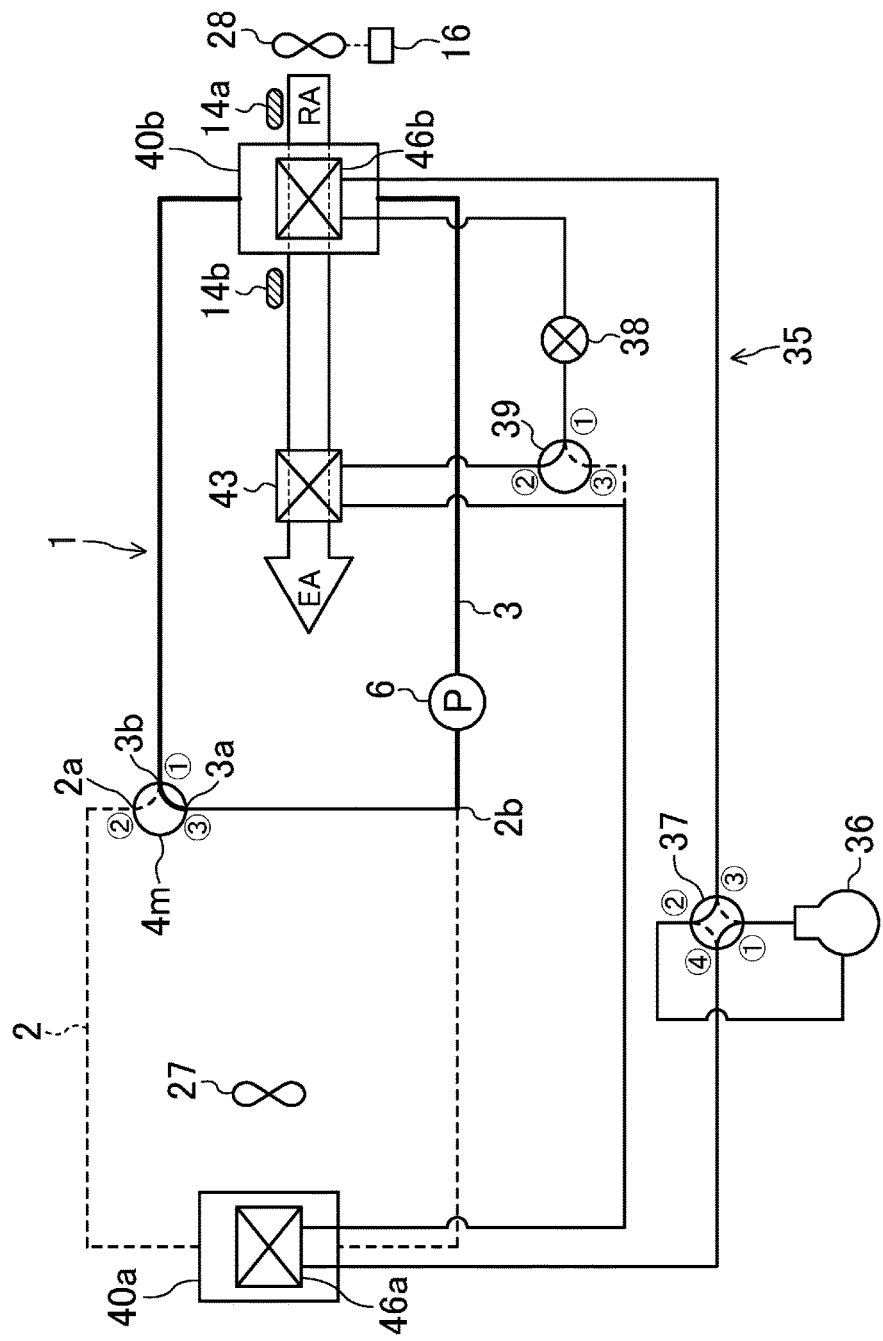
FIG. 7 is a circuit diagram of the humidity control apparatus of the first embodiment under regeneration operation during the period during which the humidification mode is stopped.

The actuation of the liquid pump (6) allows liquid absorbent to circulate through the regeneration passage (3) in the absorbent circuit (1) as illustrated in FIG. 7. In this case, liquid absorbent does not flow to the humidity control passage (2).

Liquid absorbent discharged from the liquid pump (6) flows into the absorbent passage (41*b*) of the regeneration module (40*b*). In this case, operation of the regeneration module (40*b*) is identical with that in the above-described humidification mode, and thus, the explanation thereof is omitted. Then, the low-concentration liquid absorbent that has flowed out of the regeneration module (40*b*) passes through the liquid three-way valve (4*m*), and is sucked into the liquid pump (6). Thereafter, the sucked liquid absorbent is again discharged toward the regeneration module (40*b*).

In the foregoing manner, the concentration of liquid absorbent circulating through the regeneration passage (3) decreases. When the regeneration operation terminator (9*c*) detects that the concentration has reached a predetermined concentration, the regeneration operation terminator (9*c*) outputs a stop signal to stop the liquid pump (6) and the compressor (36). Thus, the regeneration operation terminates.

—Consumed Energy During Regeneration Operation—

Here, consumed energy in the regeneration operation during the period during which the dehumidification mode is stopped and consumed energy in the regeneration operation during the period during which the humidification mode is stopped will be described.

Figure 8:
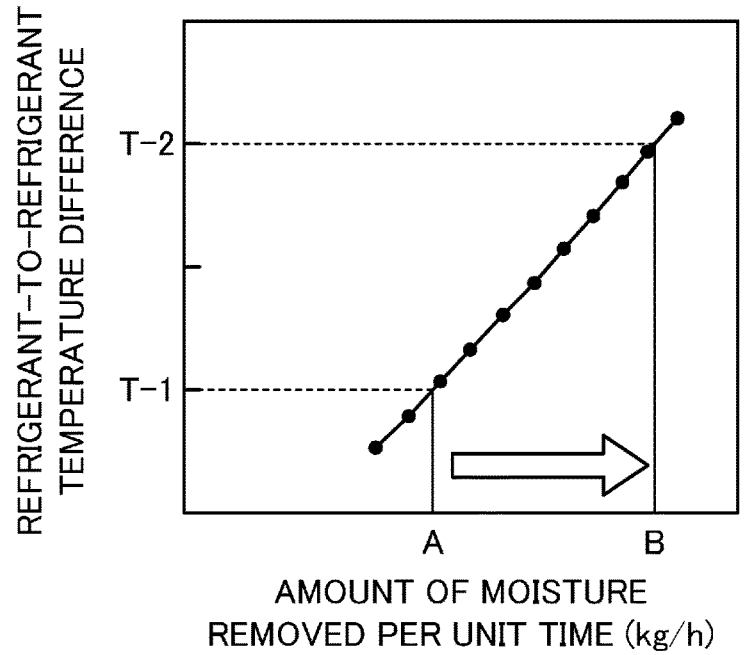
FIG. 8 is a characteristic diagram illustrating the relationship between the amount of moisture removed and the refrigerant-to-refrigerant temperature difference.

Here, consumed energy in the regeneration operation will be described. As illustrated in FIG. 8, when the amount of moisture removed per unit time is doubled in response to load (A-B), the difference in temperature between refrigerant in the heat transfer member (46*a*) of the humidity control module (40*a*) and refrigerant in the heat transfer member (46*b*) of the regeneration module (40*b*) is approximately tripled. In other words, if the load is doubled, the temperature difference T–2 between refrigerant in the heat transfer member (46*a*) and refrigerant in the heat transfer member (46*b*) is required. The refrigerant temperature difference T2 is three times as great as the refrigerant temperature difference T–1 before the increase in load.

Figure 9:
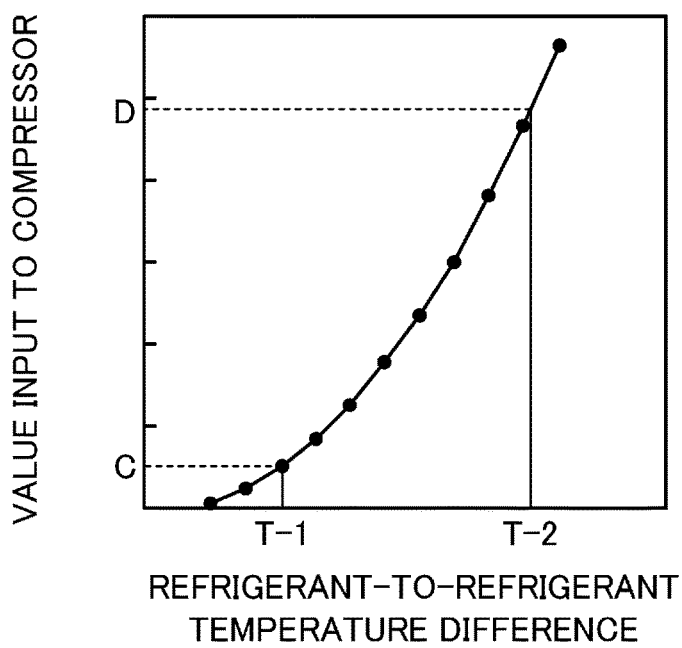
FIG. 9 is a characteristic diagram illustrating the relationship between the refrigerant-to-refrigerant temperature difference and a value input to a compressor.
Figure 10:
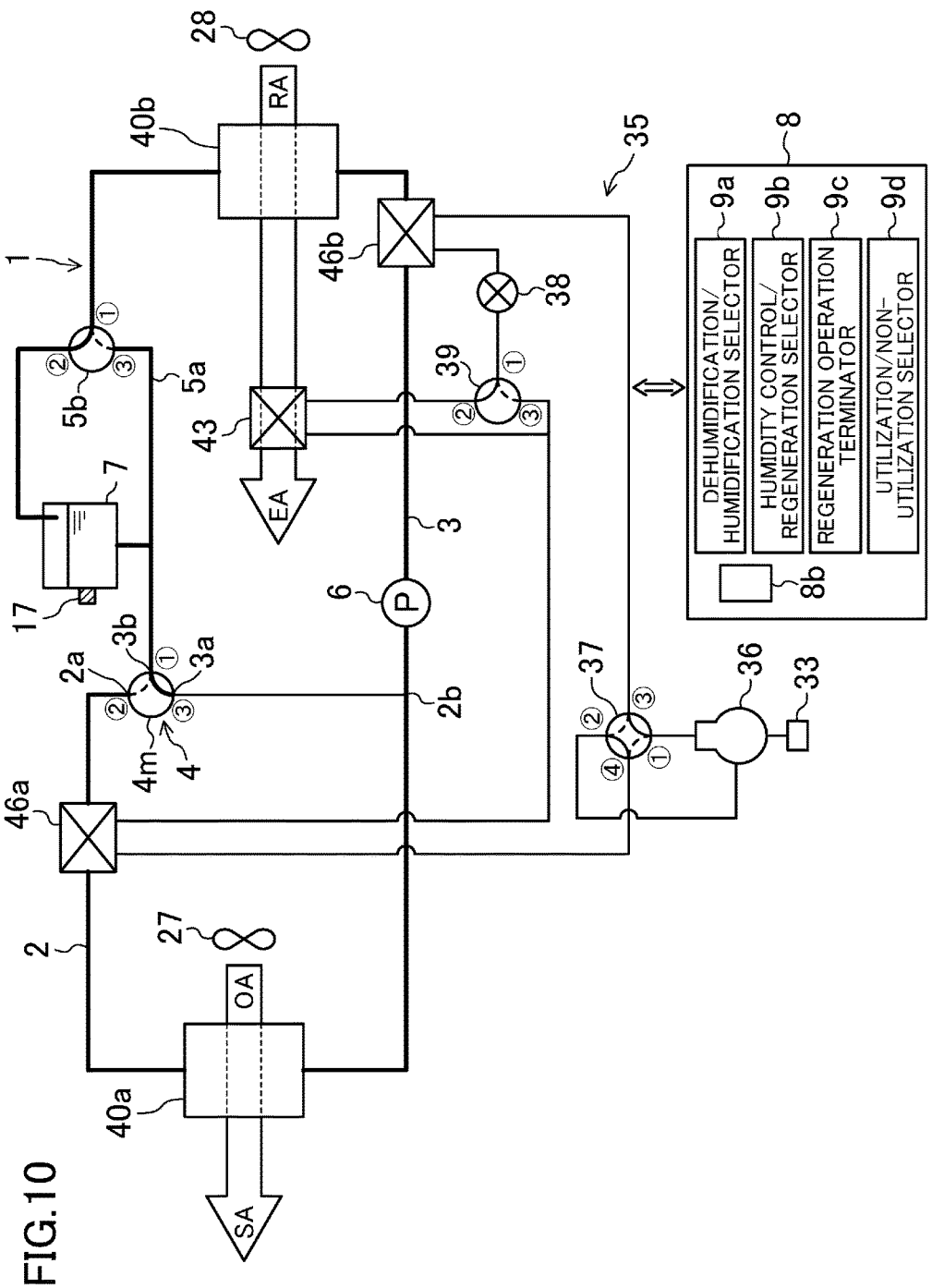
FIG. 10 is a circuit diagram of a humidity control apparatus of a first variation of the first embodiment.

In order to approximately triple the temperature difference between refrigerant in the heat transfer member (46*a*) of the humidity control module (40*a*) and refrigerant in the heat transfer member (46*b*) of the regeneration module (40*b*), the value input to the compressor (36) increases approximately ten-fold (C-D) as illustrated in FIG. 9.

Thus, when only regeneration operation is performed under low load for long hours, the concentration of liquid absorbent can be increased or decreased without increasing the value input to the compressor (36). As a result, the energy consumed in the humidity control operation is reduced.

—Advantages of First Embodiment—

According to the first embodiment, liquid absorbent is regenerated during the period during which the dehumidification mode or the humidification mode is stopped, and the regenerated liquid absorbent is, therefore, used to perform humidity control operation. This can reduce the energy consumed in the humidity control operation. As a result, the energy consumed in the humidity control operation during peak hours of electricity demand can be reduced. Thus, a so-called peak shift can be achieved, and the margin between electricity supply and demand can be prevented from being tightened.

Regeneration operation can be performed by utilizing midnight power. This can reduce the electricity rate, thereby achieving greater economy.

The energy for cooling and heating liquid absorbent in the humidity control operation can be reduced, thereby ensuring a so-called peak shift.

The refrigerant circuit (35) including the auxiliary heat exchanger (43) and the refrigerant selector (37) is provided, and liquid absorbent is cooled or heated through the refrigeration cycle. Thus, liquid absorbent can be regenerated by low-load operation. This can reduce the energy consumed in the regeneration operation, thereby improving energy saving performance.

Air can be delivered to both of the regeneration module (40*b*) and the auxiliary heat exchanger (43) with the single regeneration fan (28) without providing both of a fan for the regeneration module (40*b*) and a fan for the auxiliary heat exchanger (43). This can reduce the number of fans.

The regeneration operation can be stopped based on the concentration of liquid absorbent circulating through the regeneration passage (3). This allows the concentration of liquid absorbent to be appropriate at the end of the regeneration operation.

—First Variation of First Embodiment—

As illustrated in FIGS. 10-13, in a first variation of the first embodiment, the configurations of an absorbent circuit (1), a refrigerant circuit (35), and a controller (8) are different from those in the first embodiment. Elements equivalent to those in the first embodiment will not be described, and only the difference between the first variation and the first embodiment will be described.

—Absorbent Circuit—

A humidity control module (40*a*) of the first variation does not include a heat transfer member (46*a*), and a regeneration module (40*b*) of the first variation does not include a heat transfer member (46*b*). Instead of the heat transfer members (46*a*, 46*b*), a humidity control heat exchanger (46*a*) and a regeneration heat exchanger (46*b*) are connected to the absorbent circuit (1), and are separate from the modules (40*a*, 40*b*). Since, as such, the modules (40*a*, 40*b*) are separate from the heat transfer members (46*a*, 46*b*), the configurations of the modules (40*a*, 40*b*) can be simplified.

The humidity control heat exchanger (46*a*) forms a humidity control heat exchanger section, and the regeneration heat exchanger (46*b*) forms a regeneration heat exchanger section.

A regeneration passage (3) of the first variation includes a liquid tank (7), a bypass passage (5*a*), and a tank three-way valve (5*b*) for the tank. Specifically, the liquid tank (7), the bypass passage (5*a*), and the tank three-way valve (5*b*) are connected between the regeneration module (40*b*) and a first port of a liquid three-way valve (4*m*).

The tank three-way valve (5*b*) forms a tank selector, and allows selection between a tank utilization position in which the tank is utilized (the position shown by the solid line in FIG. 10) and a bypass position in which the tank is bypassed (the position shown by the broken line therein). A first port of the tank three-way valve (5*b*) in the tank utilization position communicates with a second port thereof, and a third port thereof is closed. In contrast, the first port of the tank three-way valve (5*b*) in the bypass position communicates with the third port thereof, and the second port thereof is closed.

The first port of the tank three-way valve (5*b*) is connected to an outlet end of an absorbent passage (41*b*) of the regeneration module (40*b*), the second port thereof is connected to an inlet end of the liquid tank (7), and the third port thereof is connected to an inlet end of the bypass passage (5*a*). An outlet end of the liquid tank (7) and an outlet end of the bypass passage (5*a*) are joined to each other, and the joined outlet ends are connected to the first port of the liquid three-way valve (4*m*).

When the tank three-way valve (5*b*) is in the tank utilization position, the regeneration passage (3) and the liquid tank (7) communicate with each other. When the tank three-way valve (5*b*) is in the bypass position, the regeneration passage (3) and the bypass passage (5*a*) communicate with each other.

Figure 11:
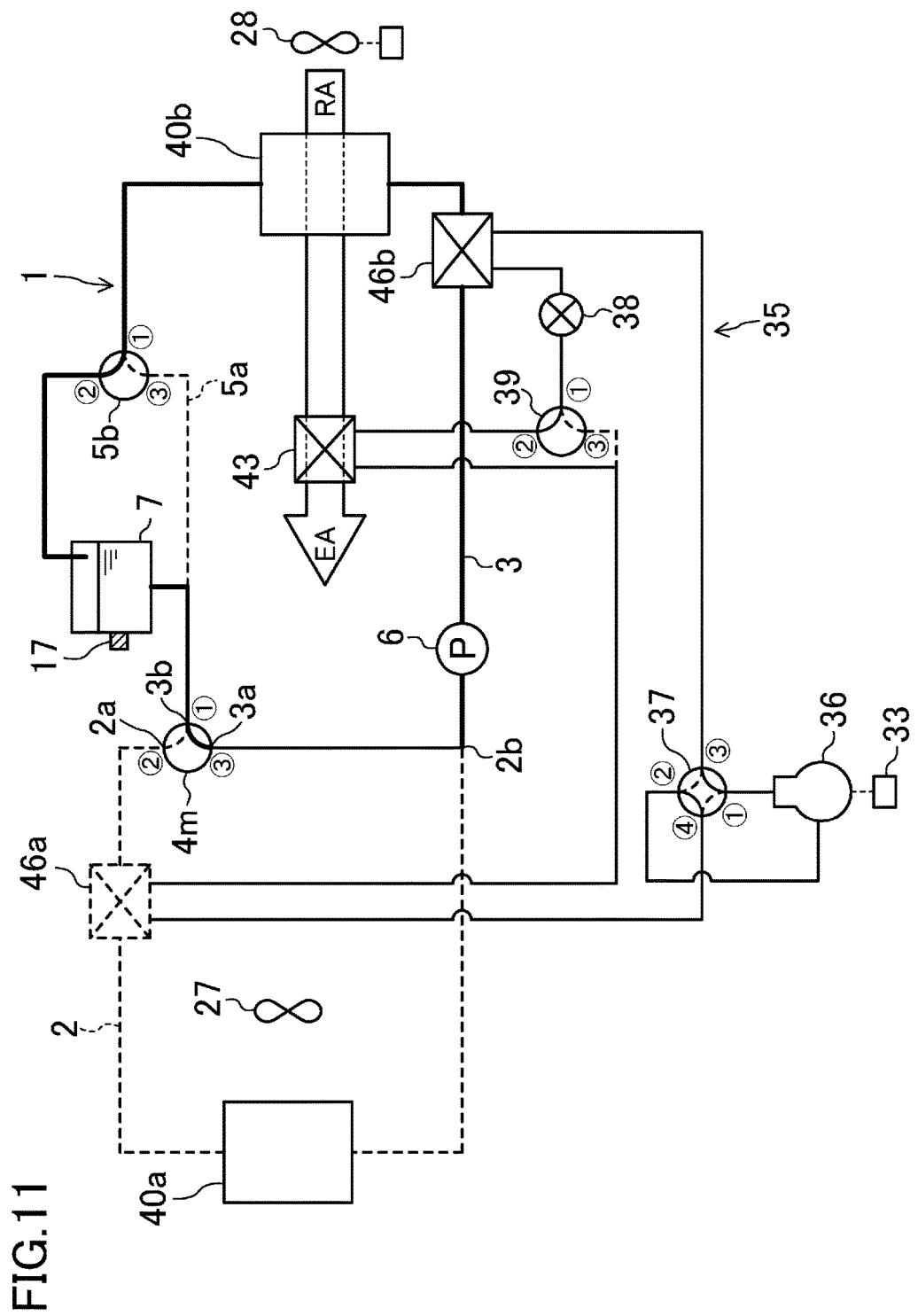
FIG. 11 is a circuit diagram of the humidity control apparatus of the first variation of the first embodiment under regeneration operation.
Figure 12:
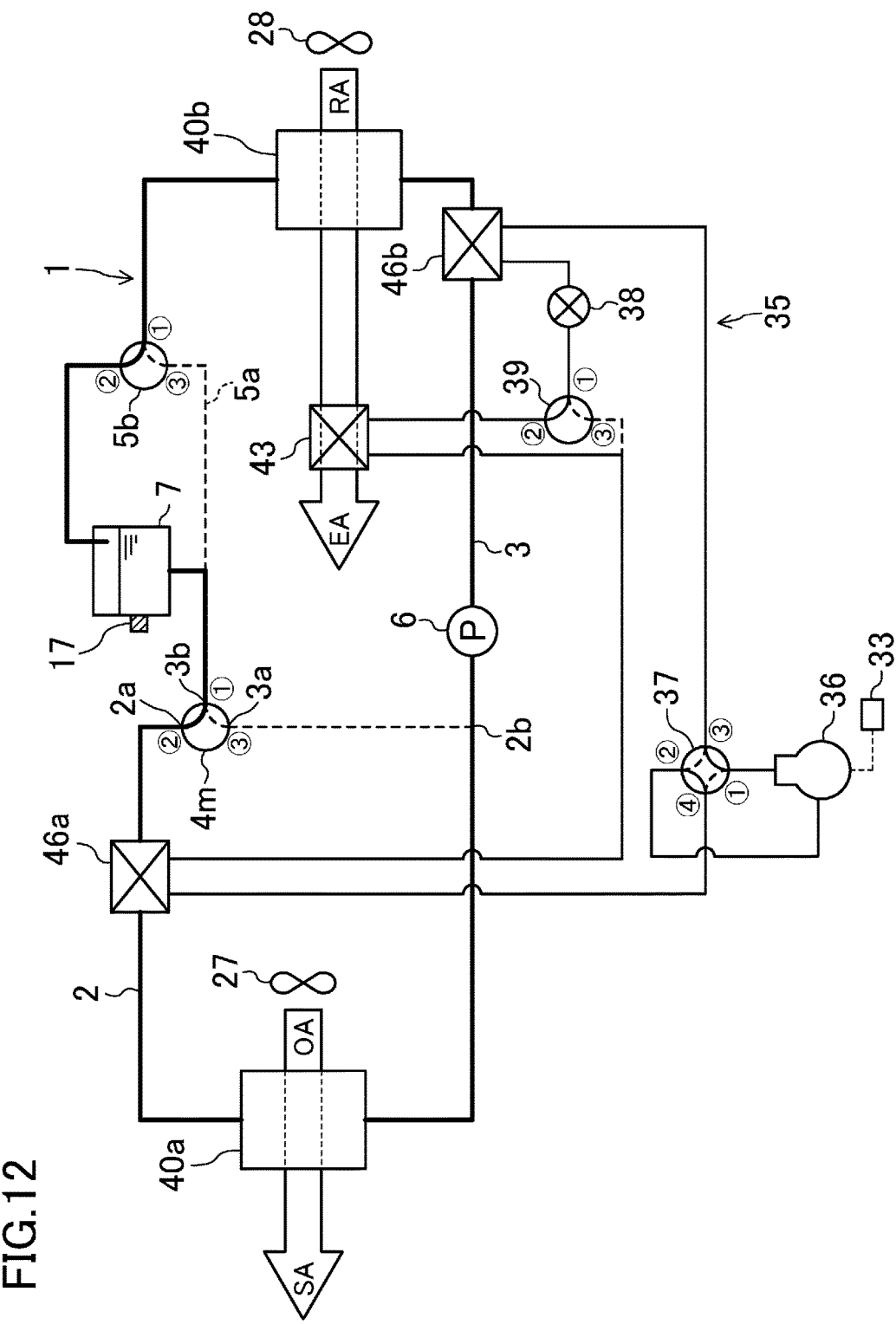
FIG. 12 is a circuit diagram of the humidity control apparatus of the first variation of the first embodiment in a situation where a liquid tank is utilized during humidity control operation.
Figure 13:
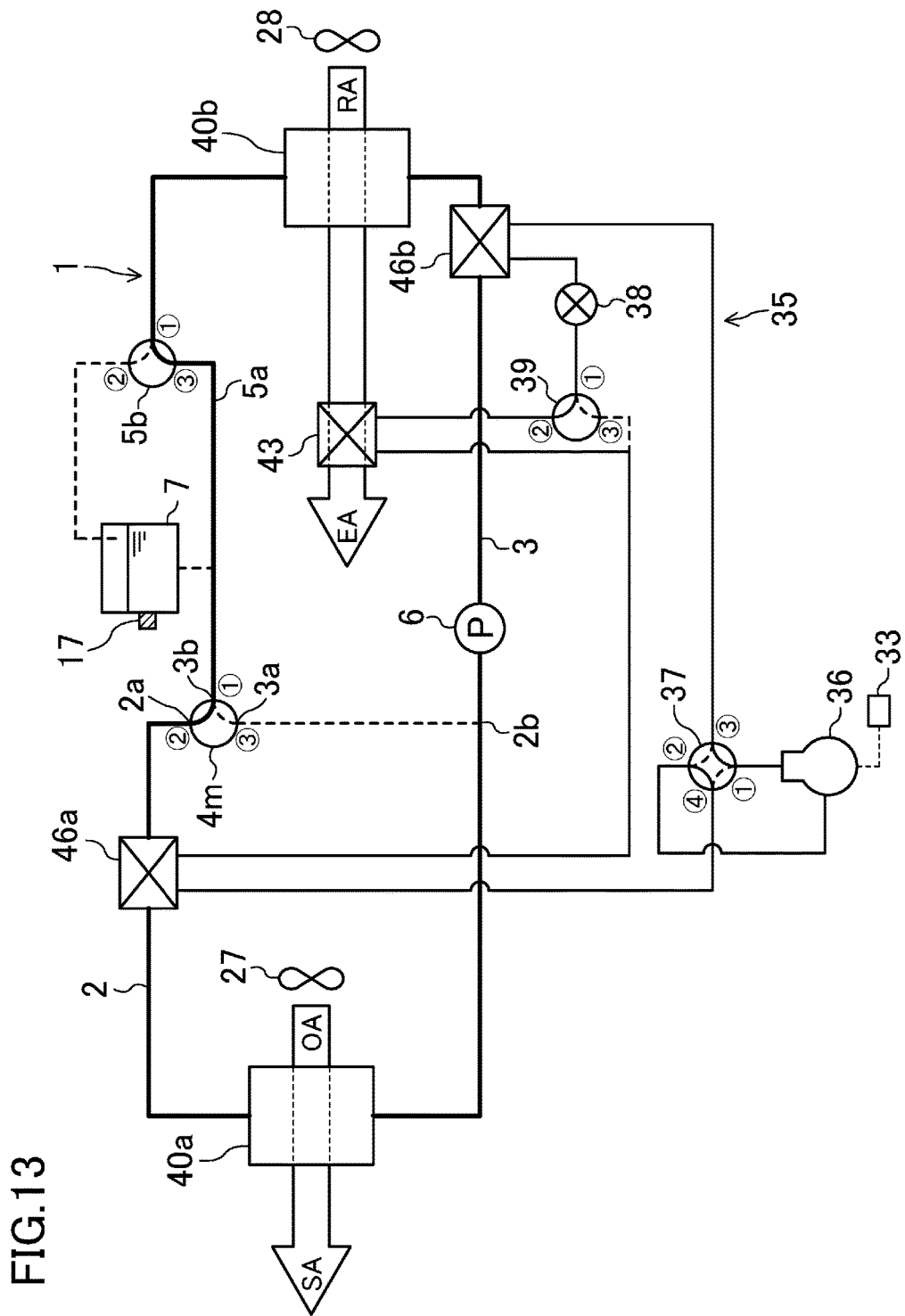
FIG. 13 is a circuit diagram of the humidity control apparatus of the first variation of the first embodiment in a situation where no liquid tank is utilized during the humidity control operation.
Figure 14:
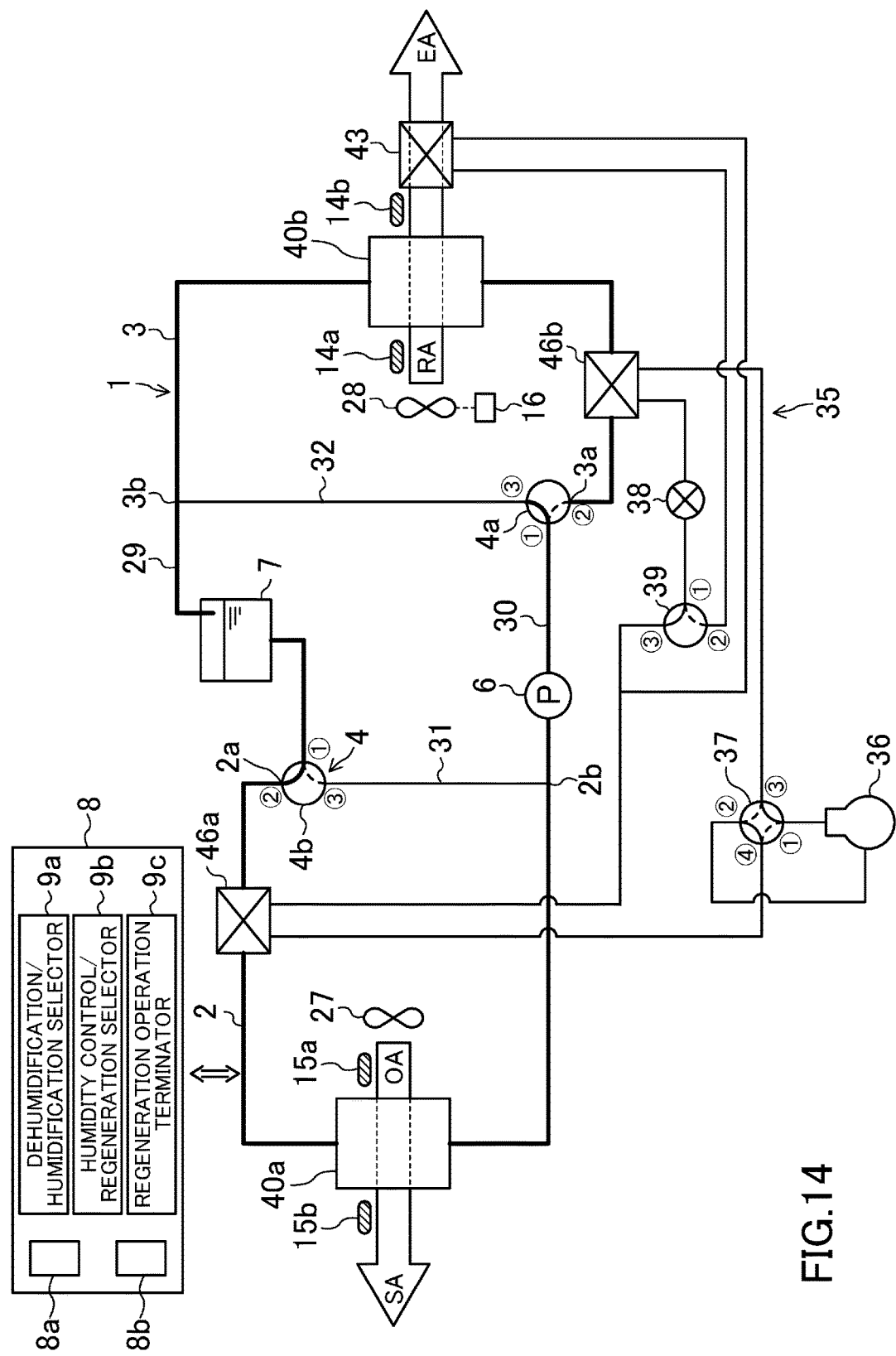
FIG. 14 is a circuit diagram of a humidity control apparatus of a second embodiment.
Figure 15:
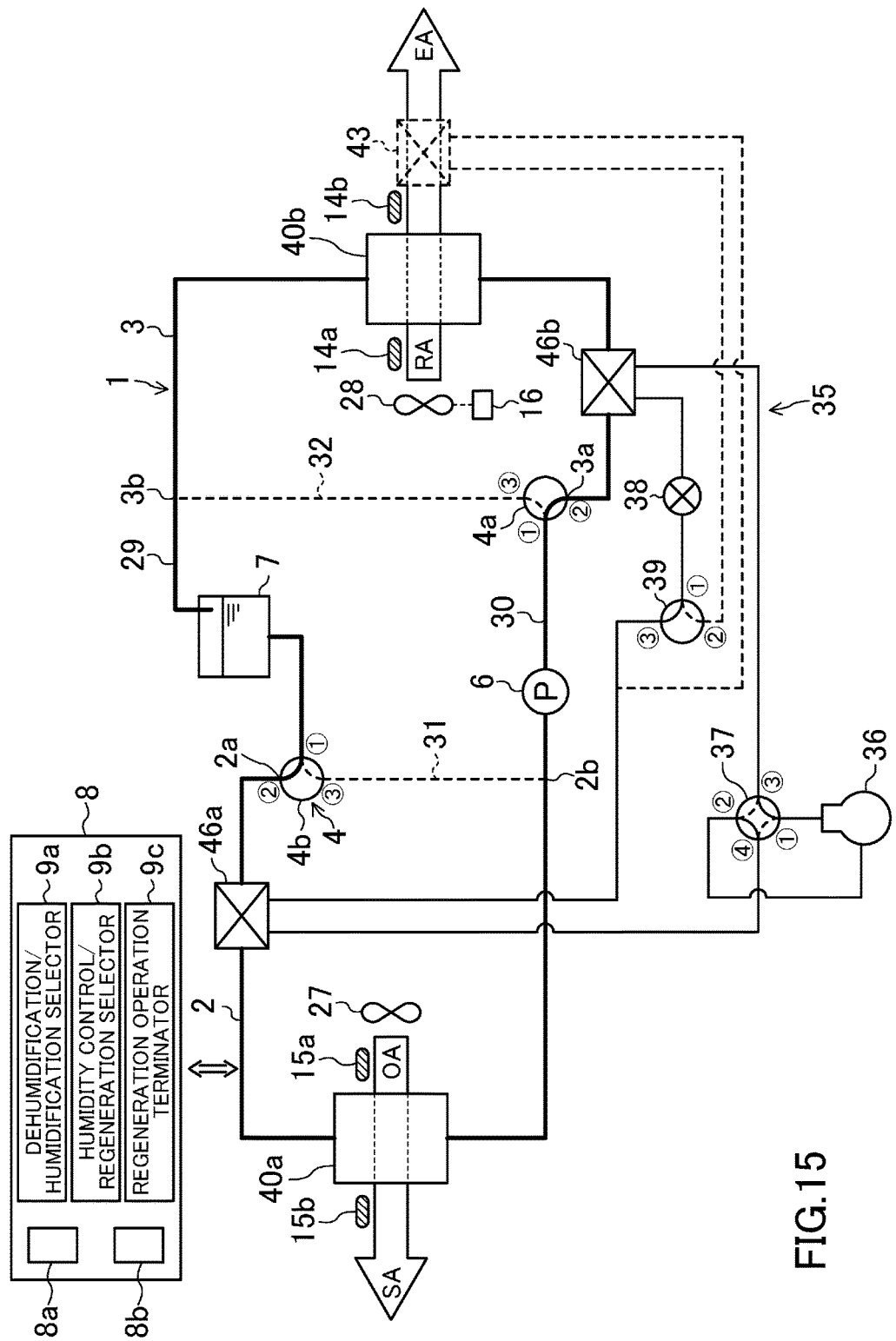
FIG. 15 is a circuit diagram of the humidity control apparatus of the second embodiment in a first humidity-controlled position in a dehumidification mode.

Specifically, when the humidity control apparatus (10) performs regeneration operation, the liquid three-way valve (4*m*) and a refrigerant three-way valve (39) are switched from a humidity-controlled position to a regenerated position, and the tank three-way valve (5*b*) is switched from the bypass position to the tank utilization position, as illustrated in FIG. 11. When the humidity control apparatus (10) performs humidity control operation, and the liquid tank (7) is utilized, the liquid three-way valve (4*m*) and the refrigerant three-way valve (39) are switched from the regenerated position to the humidity-controlled position, and the tank three-way valve (5*b*) is switched from the bypass position to the tank utilization position, as illustrated in FIG. 12. When the humidity control apparatus (10) performs humidity control operation, and the liquid tank (7) is not utilized, the liquid three-way valve (4*m*) and the refrigerant three-way valve (39) are switched from the regenerated position to the humidity-controlled position, and the tank three-way valve (5*b*) is switched from the tank utilization position to the bypass position, as illustrated in FIG. 13. Liquid absorbent circulates through a portion of the absorbent circuit (1) shown by the solid line in each of FIGS. 11-13.

As such, the provision of the liquid tank (7) allows a larger amount of regenerated liquid absorbent to be stored in the liquid tank (7) during the regeneration operation. In the humidity control operation, the liquid absorbent is drained from the liquid tank (7), and thus, can be circulated through a humidity control circuit. Thus, in the humidity control operation, a larger amount of liquid absorbent is circulated through the humidity control circuit, thereby reducing the energy consumed in the humidity control operation.

—Refrigerant Circuit—

A compressor (36) connected to the refrigerant circuit (35) of the first variation is connected to an inverter (33). The inverter (33) forms an adjuster changing the operating frequency of the compressor (36) to increase or decrease the flow rate of refrigerant circulating through the refrigerant circuit (35), and thus adjusting the capacity of the compressor (36) serving as a feeder. The increase in flow rate of the circulating refrigerant increases the amount of heat exchanged in each of the humidity control heat exchanger (46*a*), the regeneration heat exchanger (46*b*), and the auxiliary heat exchanger (43), and the decrease in flow rate of the circulating refrigerant decreases the amount of heat exchanged in each of the humidity control heat exchanger (46*a*), the regeneration heat exchanger (46*b*), and the auxiliary heat exchanger (43).

Specifically, when the humidity control capacity at which the air humidity is controlled by the humidity control module (40a) is not high enough to correspond to the humidity control load, the inverter (33) increases the operating frequency of the compressor (36) to increase the amount of heat exchanged in each of the heat exchangers (46a, 46b, 43), thereby increasing the humidity control capacity of the humidity control module (40a). When the humidity control capacity of the humidity control module (40a) is excessively high for the humidity control load, the inverter (33) decreases the operating frequency of the compressor (36) to decrease the amount of heat exchanged in each of the heat exchangers (46a, 46b, 43), thereby decreasing the humidity control capacity of the humidity control module (40a).

—Controller—

The controller (8) of the first variation is electrically connected to a liquid level sensor (17) configured to sense the liquid level in the liquid tank (7) instead of the temperature/humidity sensors (14a, 14b) and the rotational speed sensor (16). Unlike the first embodiment, the controller (8) does not include a moisture amount detector (8a), and includes only a concentration detector (8b). The concentration detector (8b) receives a signal from the liquid level sensor (17), and detects the concentration of liquid absorbent during regeneration operation.

Specifically, when the concentration of liquid absorbent is increased in the regeneration operation, moisture in the liquid absorbent is released to regeneration air. Thus, with increasing concentration of liquid absorbent, the liquid level in the liquid tank (7) lowers. When the concentration of liquid absorbent is decreased in the regeneration operation, the liquid absorbent absorbs moisture in regeneration air. Thus, with decreasing concentration of liquid absorbent, the liquid level in the liquid tank (7) rises. Such a relationship between the concentration of the liquid absorbent and the liquid level in the liquid tank (7) is utilized to detect the concentration of the liquid absorbent based on the liquid level in the liquid tank (7). The current concentration of liquid absorbent may be detected based on, for example, the difference between the liquid level at the start of the regeneration operation and the current liquid level.

As such, the concentration of the liquid absorbent can be detected based on the liquid level in the liquid tank (7). This allows the concentration of the liquid absorbent to be more easily detected than when the concentration of the liquid absorbent is directly sensed.

The controller (8) of the first variation includes a utilization/non-utilization selector (9d). The utilization/non-utilization selector (9d) controls the tank three-way valve (5b) to allow selection between a position in which the liquid tank (7) and the regeneration passage (3) communicate with each other and a position in which the liquid tank (7) and the regeneration passage (3) do not communicate with each other.

Here, when the humidity control capacity is not high enough to correspond to the humidity control load, the operating frequency of the inverter (33) increases, and when the humidity control capacity is excessively high for the humidity control load, the operating frequency of the inverter (33) decreases. In other words, it is estimated that with increasing operating frequency of the inverter (33), the humidity control load tends to increase, and with decreasing operating frequency of the inverter (33), the humidity control load tends to decrease.

Based on the foregoing estimation, when the operating frequency of the inverter (33) is greater than or equal to a first value, it is determined that the humidity control load tends to be high. In this case, the tank three-way valve (5b) is switched from the bypass position to the tank utilization position. Thus, regenerated liquid absorbent flows from the liquid tank (7) into the absorbent circuit (1).

Thus, when the humidity control apparatus (10) is in a dehumidification mode, high-concentration liquid absorbent flows from the liquid tank (7) to the absorbent circuit (1), and the dehumidification capacity of the humidity control module (40a) increases. In contrast, when the humidity control apparatus (10) is in a humidification mode, low-concentration liquid absorbent flows from the liquid tank (7) to the absorbent circuit (1), and the humidification capacity of the humidity control module (40a) increases. As such, when the humidity control load tends to be high, the liquid tank (7) can be opened, and a larger amount of liquid absorbent than required can be prevented from flowing out of the liquid tank (7). The other configurations, operations, and advantages are similar to those in the first embodiment.

—Second Variation of First Embodiment—

In a second variation of the first embodiment, the configuration of a controller (8) is different from that in the first embodiment. Elements equivalent to those in the first embodiment will not be described, and only the difference between the second variation and the first embodiment will be described.

—Controller—

A regeneration operation terminator (9c) of the controller (8) of the second variation terminates regeneration operation based on the amount of moisture released from or absorbed by liquid absorbent in the regeneration module (40b), without sensing the concentration of liquid absorbent circulating through the regeneration passage (3) during the regeneration operation. In other words, the controller (8) does not include the concentration detector (8b) of the first embodiment, and includes only a moisture amount detector (8a). Operation in which the moisture amount detector (8a) calculates the amount of moisture is identical with that of the first embodiment, and the explanation thereof is omitted.

Specifically, in a situation where the concentration of liquid absorbent is increased in the regeneration operation, if, during the regeneration operation, the total amount of moisture released to regeneration air in the regeneration module (40b) is greater than a predetermined value, it is determined that the concentration of liquid absorbent has been increased to a predetermined concentration, thereby stopping the regeneration operation. In a situation where the concentration of liquid absorbent is decreased in the regeneration operation, if, during the regeneration operation, the total amount of moisture absorbed from regeneration air in the regeneration module (40b) is greater than a predetermined value, it is determined that the concentration of liquid absorbent has been decreased to a predetermined concentration, thereby stopping the regeneration operation.

The above configuration allows the concentration of liquid absorbent to be appropriate at the end of the regeneration operation, and can prevent the regeneration operation from being excessively performed. The other configurations, operations, and advantages are similar to those of the first embodiment.

Second Embodiment of the Invention

A second embodiment of the present invention will be described. In the second embodiment illustrated in FIGS. 14-17, the configurations of an absorbent circuit (1) and a controller (8) are different from those of the first embodiment. Elements equivalent to those in the first embodiment will not be described, and only the difference between the second embodiment and the first embodiment will be described.

—Absorbent Circuit—

A humidity control module (40a) of the second embodiment does not include a heat transfer member (46a), and a regeneration module (40b) of the second embodiment does not include a heat transfer member (46b). Similarly to the first variation of the first embodiment, instead of the heat transfer members (46a, 46b), a humidity control heat exchanger (46a) and a regeneration heat exchanger (46b) are connected to the absorbent circuit (1), and are separate from the modules (40a, 40b). Since, as such, the modules (40a, 40b) are separate from the heat transfer members (46a, 46b), the configurations of the modules (40a, 40b) can be simplified.

The absorbent circuit (1) of the second embodiment includes a humidity control passage (2), a regeneration passage (3), first and second liquid three-way valves (4a, 4b), and first through fourth liquid passages (29-32). The first and second liquid three-way valves (4a, 4b) form a circuit selector (4). The humidity control passage (2) is connected to the humidity control module (40a) and the humidity control heat exchanger (46a), and the regeneration passage (3) is connected to the regeneration module (40b) and the regeneration heat exchanger (46b).

Figure 16:
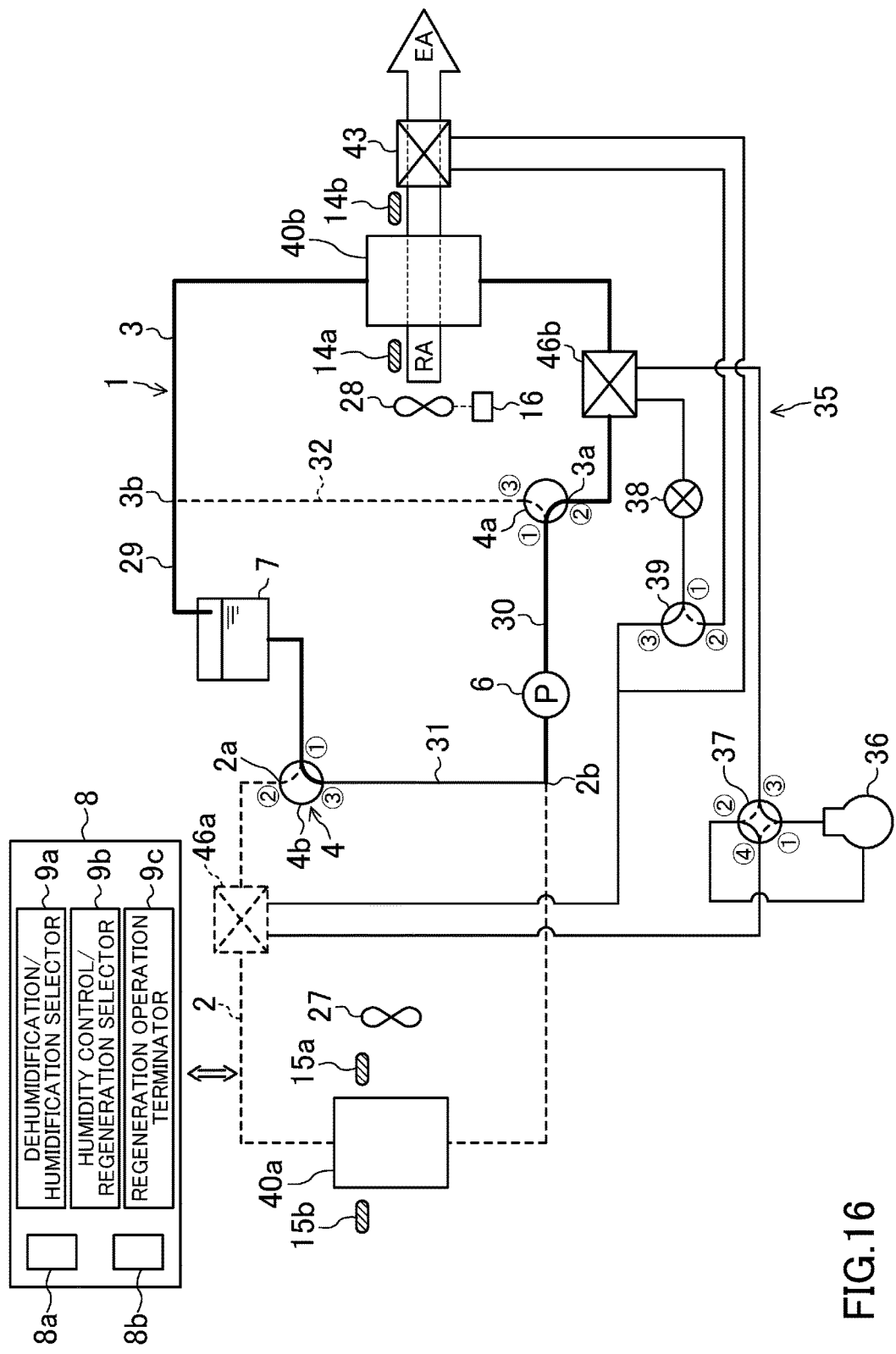
FIG. 16 is a circuit diagram of the humidity control apparatus of the second embodiment under regeneration operation during the period during which the dehumidification mode is stopped.
Figure 17:
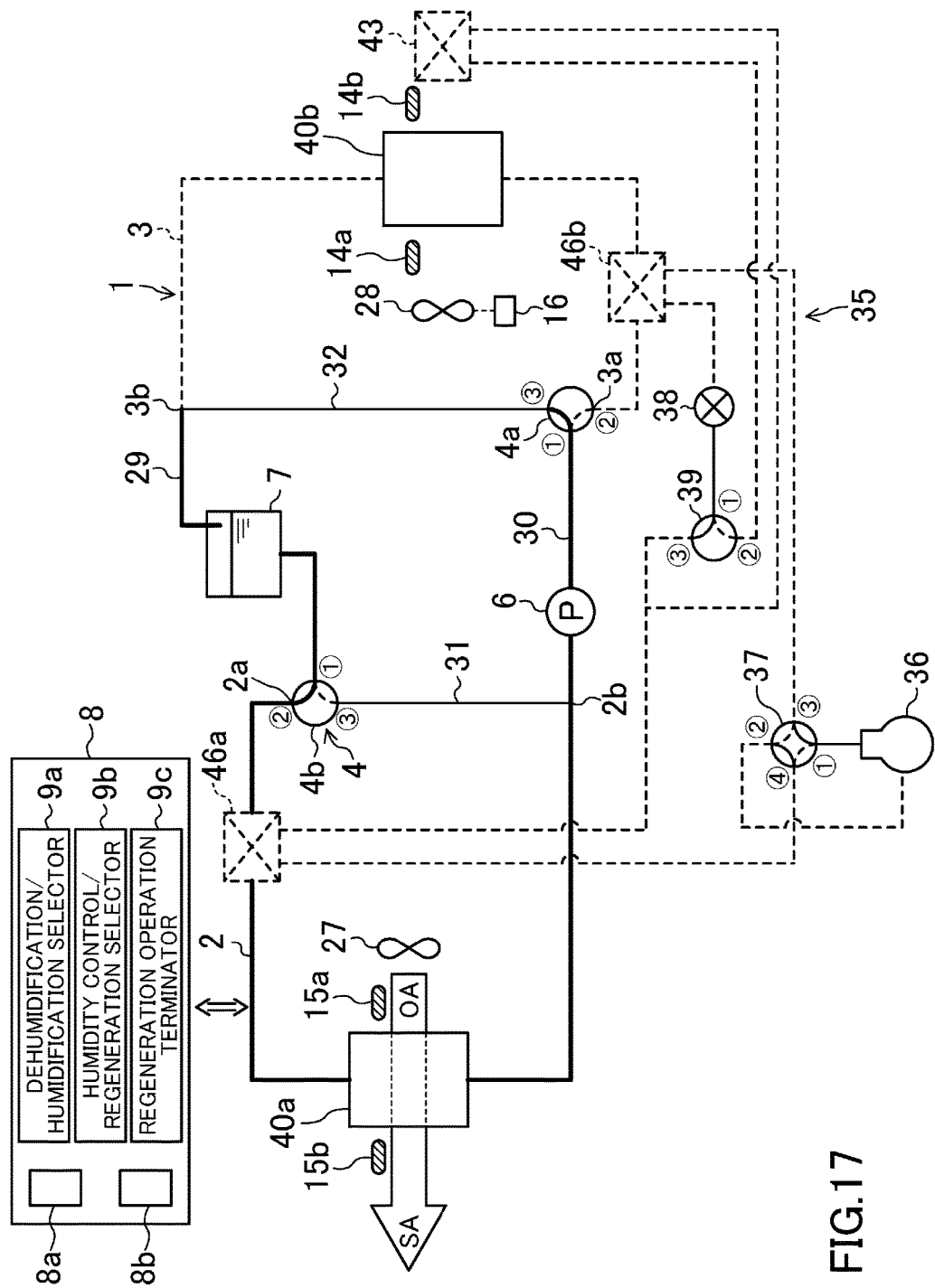
FIG. 17 is a circuit diagram of the humidity control apparatus of the second embodiment in a second humidity-controlled position in the dehumidification mode.

The first and second liquid three-way valves (4a, 4b) are configured to switch the absorbent circuit (1) among a first humidity-controlled position (see FIG. 15), a regenerated position (see FIG. 16), and a second humidity-controlled position (see FIG. 17). Specifically, a humidity-controlled position of this embodiment includes the first humidity-controlled position (see FIG. 15) and the second humidity-controlled position (see FIG. 17). In the first humidity-controlled position, liquid absorbent circulates between the humidity control passage (2) and the regeneration passage (3), and is heated and cooled to perform humidity control operation. In the second humidity-controlled position, liquid absorbent circulates between the humidity control passage (2) and a liquid tank (7), and humidity control operation is performed without heating or cooling the liquid absorbent.

A first port of each of the first and second liquid three-way valves (4a, 4b) in the first humidity-controlled position communicates with a second port thereof, and a third port thereof is closed. While the first and second ports of the first liquid three-way valve (4a) in the regenerated position communicate with each other, and the third port thereof is closed, the first and third ports of the second liquid three-way valve (4b) in the regenerated position communicate with each other, and the second port thereof is closed. While the first and third ports of the first liquid three-way valve (4a) in the second humidity-controlled position communicate with each other, and the second port thereof is closed, the first and second ports of the second liquid three-way valve (4b) in the second humidity-controlled position communicate with each other, and the third port thereof is closed.

The first port of the first liquid three-way valve (4a) is connected to one end of the second liquid passage (30), the second port thereof is connected to an inlet end (3a) of the regeneration passage (3), and the third port thereof is connected to one end of the fourth liquid passage (32).

The first port of the second liquid three-way valve (4b) is connected to one end of the first liquid passage (29), the second port thereof is connected to an inlet end (2a) of the humidity control passage (2), and the third port thereof is connected to one end of the third liquid passage (31).

An outlet end (3b) of the regeneration passage (3) communicates with the other end of each of the first and fourth liquid passages (29, 32). An outlet end (2b) of the humidity control passage (2) communicates with the other end of each of the second and third liquid passages (30, 31). The first liquid passage (29) includes the liquid tank (7), and the second liquid passage (30) is connected to a liquid pump (6).

In the first humidity-controlled position, a humidity control circuit is formed in which liquid absorbent circulates through the liquid pump (6), the regeneration heat exchanger (46b), the regeneration module (40b), the liquid tank (7), the humidity control heat exchanger (46a), and the humidity control module (40a) sequentially. In the regenerated position, a regeneration circuit is formed in which liquid absorbent circulates through the liquid pump (6), the regeneration heat exchanger (46b), the regeneration module (40b), and the liquid tank (7) sequentially. In the second humidity-controlled position, a humidity control circuit is formed in which liquid absorbent circulates through the liquid pump (6), the liquid tank (7), the humidity control heat exchanger (46a), and the humidity control module (40a) sequentially.

—Controller—

Unlike the first embodiment, the controller (8) of the second embodiment is connected to temperature/humidity sensors (15a, 15b) each configured to sense the temperature and humidity of air passing through the humidity control module (40a). The temperature/humidity sensors (15a, 15b) are respectively provided near the inlet and outlet of an air passage (42) of the humidity control module (40a).

A humidity control/regeneration selector (9b) of the controller (8) of the second embodiment switches, for example, the operating status of the humidity control apparatus (10) between first or second humidity control operation and regeneration operation. When a signal for stopping the humidity control operation of the humidity control apparatus (10) is fed to the humidity control/regeneration selector (9b), the humidity control/regeneration selector (9b) switches each of the refrigerant three-way valve (39) and the first and second liquid three-way valves (4a, 4b) from the humidity-controlled position to the regenerated position. When a signal for starting the humidity control operation of the humidity control apparatus (10) is fed to the humidity control/regeneration selector (9b), the humidity control/regeneration selector (9b) switches each of the refrigerant three-way valve (39) and the first and second liquid three-way valves (4a, 4b) from the regenerated position to the humidity-controlled position.

When the humidity control apparatus (10) is in the second humidity-controlled position, the humidity control/regeneration selector (9b) switches the operating status of the humidity control apparatus (10) from the second humidity control operation to the first humidity control operation, based on values sensed by the humidity-control-side temperature/humidity sensors (15a, 15b), i.e., the absolute humidity levels of air the humidity of which is controlled by the humidity control module (40a).

Specifically, when the difference in absolute humidity between air near the inlet of the humidity control module (40a) and air near the outlet thereof is less than or equal to a predetermined value, it is determined that the amount of humidity-controlled target air has decreased. The operating status of the humidity control apparatus (10) is switched from the second humidity control operation to the first humidity control operation. Thus, liquid absorbent in the absorbent circuit (1) is regenerated.

<Operational Behavior of Humidity Control Apparatus>

Next, the operational behavior of the humidity control apparatus (10) will be described.

—First Humidity-Controlled Position of Dehumidification Mode—

In the first humidity-controlled position of the dehumidification mode, taken outside air (target air) (OA) is dehumidified, and is then supplied, as supply air (SA), into a room, moisture is given to taken room air (regeneration air) (RA), and the room air to which the moisture has been given is then discharged, as ejection air (EA), to outside the room.

Specifically, the dehumidification/humidification selector (9a) of the controller (8) places the four-way valve (37) in the air-dehumidified position. The humidity control/regeneration selector (9b) places each of the refrigerant three-way valves (39) and the first and second liquid three-way valves (4a, 4b) in the humidity-controlled position (see FIG. 15). Thereafter, the humidity control fan (27), the regeneration fan (28), the compressor (36), and the liquid pump (6) start working, and the degree of opening of the expansion valve (38) is appropriately adjusted.

Operation of the refrigerant circuit (35) followed by the actuation of the compressor (36) is identical with the operation of the refrigerant circuit (35) in the dehumidification mode of the first embodiment, and thus, the explanation thereof is omitted. Furthermore, operation of the absorbent circuit (1) followed by the actuation of the liquid pump (6) is identical with the operation of the absorbent circuit (1) in the dehumidification mode of the first embodiment, and thus, the explanation thereof is omitted.

—Regeneration Operation During Period During which Dehumidification Mode is Stopped—

In the regeneration operation, the concentration of liquid absorbent in the absorbent circuit (1) is increased until the dehumidification mode is again started.

Specifically, the humidity control/regeneration selector (9b) places the refrigerant three-way valve (39) in the regenerated position, and places each of the first and second liquid three-way valves (4a, 4b) in the regenerated position (see FIG. 16). Thereafter, the regeneration fan (28), the compressor (36), and the liquid pump (6) start working, and the degree of opening of the expansion valve (38) is appropriately adjusted. Note that the humidity control fan (27) is at rest.

Operation of the refrigerant circuit (35) followed by the actuation of the compressor (36) is identical with the operation of the refrigerant circuit (35) in the regeneration operation during the period during which the dehumidification mode is stopped in the first embodiment, and thus, the explanation thereof is omitted. Furthermore, operation of the absorbent circuit (1) followed by the actuation of the liquid pump (6) is identical with the operation of the absorbent circuit (1) in the regeneration operation during the period during which the dehumidification mode is stopped in the first embodiment, and thus, the explanation thereof is omitted.

—Second Humidity-Controlled Position of Dehumidification Mode—

In the second humidity-controlled position of the dehumidification mode, taken outside air (target air) (OA) is dehumidified, and is then supplied, as supply air (SA), into a room. Note that operation is not performed in which moisture is given to taken room air (regeneration air) (RA), and the room air to which the moisture has been given is then discharged, as ejection air (EA), to outside the room.

Specifically, the dehumidification/humidification selector (9a) of the controller (8) places the four-way valve (37) in the air-dehumidified position. The humidity control/regeneration selector (9b) places the refrigerant three-way valves (39) in the humidity-controlled position, and places each of the first and second liquid three-way valves (4a, 4b) in the second humidity-controlled position (see FIG. 17). Thereafter, the humidity control fan (27) and the liquid pump (6) start working. Note that the compressor (36) and the regeneration fan (28) do not start working.

The actuation of the liquid pump (6) allows liquid absorbent to circulate through the liquid pump (6), the liquid tank (7), the humidity control heat exchanger (46a), and the humidity control module (40a) sequentially.

The actuation of the liquid pump (6) allows high-concentration liquid absorbent stored under the regenerated position to flow into an absorbent passage (41a) of the humidity control module (40a) after passing through the humidity control heat exchanger (46a) without exchanging heat. In the humidity control module (40a), water vapor contained in the target air passes through a moisture permeable membrane (62), and is absorbed by liquid absorbent flowing through the absorbent passage (41a). Thereafter, the target air dehumidified during the passage of the target air through the air passage (42) of the humidity control module (40a) is supplied into the room.

As such, in the humidity control module (40a), part of the water vapor contained in the target air in the air passage (42) passes through the moisture permeable membrane (62), and is absorbed by the liquid absorbent. Thus, in the humidity control module (40a), while the liquid absorbent passes through the absorbent passage (41a), the concentration of the liquid absorbent gradually decreases. The low-concentration liquid absorbent that has flowed out of the humidity control module (40a) is sucked into the liquid pump (6), and thereafter is again delivered toward the liquid tank (7).

—First Humidity-Controlled Position of Humidification Mode—

In the first humidity-controlled position of the humidification mode, taken outside air (target air) (OA) is humidified, and is then supplied, as supply air (SA), into a room, moisture in taken room air (regeneration air) (RA) is absorbed, and the taken room air from which the moisture has been absorbed is then discharged, as ejection air (EA), to outside the room.

Specifically, the dehumidification/humidification selector (9a) of the controller (8) places the four-way valve (37) in the air-humidified position. The humidity control/regeneration selector (9b) places each of the refrigerant three-way valve (39) and the first and second liquid three-way valves (4a, 4b) in the first humidity-controlled position. Thereafter, the humidity control fan (27), the regeneration fan (28), the compressor (36), and the liquid pump (6) start working, and the degree of opening of the expansion valve (38) is appropriately adjusted.

Operation of the refrigerant circuit (35) followed by the actuation of the compressor (36) is identical with the operation of the refrigerant circuit (35) in the humidification mode of the first embodiment, and thus, the explanation thereof is omitted. Furthermore, operation of the absorbent circuit (1) followed by the actuation of the liquid pump (6) is identical with the operation of the absorbent circuit (1) in the humidification mode of the first embodiment, and thus, the explanation thereof is omitted.

—Regeneration Operation During Period During which Humidification Mode is Stopped—

In the regeneration operation, the concentration of liquid absorbent in the absorbent circuit (1) is decreased until the humidification mode is again started.

Specifically, the dehumidification/humidification selector (9a) of the controller (8) places the four-way valve (37) in the air-humidified position. The humidity control/regeneration selector (9b) places the refrigerant three-way valve (39) in the regenerated position, and places each of the first and second liquid three-way valves (4a, 4b) in the regenerated position. Thereafter, the regeneration fan (28), the compressor (36), and the liquid pump (6) start working, and the degree of opening of the expansion valve (38) is appropriately adjusted. Note that the humidity control fan (27) is at rest.

Operation of the refrigerant circuit (35) followed by the actuation of the compressor (36) is identical with the operation of the refrigerant circuit (35) in the regeneration operation during the period during which the humidification mode is stopped in the first embodiment, and thus, the explanation thereof is omitted. Furthermore, operation of the absorbent circuit (1) followed by the actuation of the liquid pump (6) is identical with the operation of the absorbent circuit (1) in the regeneration operation during the period during which the humidification mode is stopped in the first embodiment, and thus, the explanation thereof is omitted.

—Second Humidity-Controlled Position of Humidification Mode—

In the second humidity-controlled position of the humidification mode, taken outside air (target air) (OA) is humidified, and is then supplied, as supply air (SA), into a room. Note that operation is not performed in which moisture in taken room air (regeneration air) (RA) is absorbed, and the taken room air from which moisture has been absorbed is then discharged, as ejection air (EA), to outside the room.

Specifically, the dehumidification/humidification selector (9a) of the controller (8) places the four-way valve (37) in the air-humidified position. The humidity control/regeneration selector (9b) places each of the refrigerant three-way valve (39) and the first and second liquid three-way valves (4a, 4b) in the second humidity-controlled position of the humidity-controlled position. Thereafter, the humidity control fan (27) and the liquid pump (6) start working. Note that the compressor (36) and the regeneration fan (28) do not start working.

The actuation of the liquid pump (6) allows liquid absorbent to circulate through the liquid pump (6), the liquid tank (7), the humidity control heat exchanger (46a), and the humidity control module (40a) sequentially.

The actuation of the liquid pump (6) allows low-concentration liquid absorbent stored under the regenerated position to flow into the absorbent passage (41a) of the humidity control module (40a) after passing through the humidity control heat exchanger (46a) without exchanging heat. In the humidity control module (40a), part of water contained in the liquid absorbent changes into water vapor, and the water vapor passes through the moisture permeable membrane (62), and is given to target air flowing through the air passage (42). Thereafter, the target air humidified during the passage of the target air through the air passage (42) of the humidity control module (40a) is supplied into the room.

As such, part of the water contained in the liquid absorbent in the absorbent passage (41a) passes through the moisture permeable membrane (62) to humidify the target air. Thus, in the humidity control module (40a), while the liquid absorbent passes through the absorbent passage (41a), the concentration of the liquid absorbent gradually increases. The high-concentration liquid absorbent that has flowed out of the humidity control module (40a) is sucked into the liquid pump (6), and thereafter is again delivered toward the liquid tank (7).

—Advantages of Second Embodiment—

According to the second embodiment, regenerated liquid absorbent in the liquid tank (7) is utilized in the humidity control operation. This enables the omission of cooling or heating of liquid absorbent in the humidity control operation, enables a so-called peak shift, and can ensure that the margin between electricity supply and demand is prevented from being tightened.

Humidity control operation in which liquid absorbent is cooled or heated, and humidity control operation in which liquid absorbent is not cooled or heated can be selectively performed. Thus, operation can be performed in response to the humidity control load.

In the regenerated position, adequately regenerated liquid absorbent is stored in the liquid tank (7), and the stored liquid absorbent is utilized to perform humidity control operation. For this reason, in the humidity control operation, not only the regeneration heat exchanger (46b) but also the humidity control heat exchanger (46a) can stop exchanging heat. This can reduce the consumed energy. The other configurations, operations, and advantages are similar to those of the first embodiment.

INDUSTRIAL APPLICABILITY

As described above, the present invention is useful for humidity control apparatuses configured to adjust the humidity of air using liquid absorbent.

DESCRIPTION OF REFERENCE CHARACTERS

1 ABSORBENT CIRCUIT
2 HUMIDITY CONTROL PASSAGE (HUMIDITY CONTROL PASSAGE)
3 REGENERATION PASSAGE (REGENERATION PASSAGE)
4 CIRCUIT SELECTOR
4m LIQUID THREE-WAY VALVE
4a FIRST LIQUID THREE-WAY VALVE
4b SECOND LIQUID THREE-WAY VALVE
8 CONTROLLER
8a MOISTURE AMOUNT DETECTOR
8b CONCENTRATION DETECTOR
10 HUMIDITY CONTROL APPARATUS
35 REFRIGERANT CIRCUIT
40a HUMIDITY CONTROL MODULE (HUMIDITY CONTROLLER)
40b REGENERATION MODULE (REGENERATOR)
36 COMPRESSOR
43 AUXILIARY HEAT EXCHANGER (AUXILIARY HEAT EXCHANGER SECTION)
46a HEAT TRANSFER MEMBER OF HUMIDITY CONTROL MODULE (HUMIDITY CONTROL HEAT EXCHANGER SECTION)
46b HEAT TRANSFER MEMBER OF REGENERATION MODULE (REGENERATION HEAT EXCHANGER SECTION)

The invention claimed is:

1. A humidity control apparatus for performing humidity control operation in which target air is humidified using liquid absorbent, the apparatus comprising:
an absorbent circuit through which the liquid absorbent circulates and which includes
a humidity controller configured to control a humidity of the target air by exchanging moisture between the target air and the liquid absorbent, and a regenerator configured to regenerate the liquid absorbent by exchanging moisture between regeneration air and the liquid absorbent;

a regeneration heat exchanger section provided in the absorbent circuit to cool or heat the liquid absorbent exchanging moisture with the regeneration air;

a humidity control heat exchanger section provided in the absorbent circuit to heat or cool the liquid absorbent exchanging moisture with the target air;

a circuit selector provided in the absorbent circuit to switch the absorbent circuit to a regenerated position in which the liquid absorbent flows through the regenerator and the regeneration heat exchanger section such that during a period during which the humidity control operation is stopped, only regeneration operation for regenerating the liquid absorbent is performed;

a refrigerant circuit in which
refrigerant circulates among a compressor, the humidity control heat exchanger section, the regeneration heat exchanger section, and an auxiliary heat exchanger section to perform a refrigeration cycle,
the refrigerant passing through the humidity control heat exchanger section and the regeneration heat exchanger section exchanges heat with the liquid absorbent, and
the refrigerant passing through the auxiliary heat exchanger section exchanges heat with heat source fluid; and a controller programmed to control the circuit selector to stop the humidity control operation and cause only the regeneration operation for regenerating the liquid absorbent to be performed, wherein the auxiliary heat exchanger section is configured to exchange heat between the refrigerant circulating through the refrigerant circuit and air, the refrigerant circuit includes an expansion valve and a refrigerant three-way valve which are disposed between the humidity control heat exchanger section and the regeneration heat exchanger section, the refrigerant three-way valve has first, second, and third ports respectively connected to the expansion valve, the auxiliary heat exchanger section, and the humidity control heat exchanger section, the refrigerant three-way valve is configured to be selectable between a bypass position in which the first port communicates with the third port so that the refrigerant flows through the refrigerant three-way valve to bypass the auxiliary heat exchanger section, and a circulation position in which the first port communicates with the second port so that the refrigerant flows through the refrigerant three-way valve to pass through the auxiliary heat exchanger section, and the controller is programmed to place the refrigerant three-way valve in the bypass position during the humidity control operation and to place the refrigerant three-way valve in the circulation position during the regeneration operation performed while the humidity control operation is stopped.

2. The humidity control apparatus of claim 1, wherein
the absorbent circuit includes,
a humidity control passage in which,
while the humidity control heat exchanger section heats the liquid absorbent in the humidity controller, moisture is released from the liquid absorbent to the target air, and
while the humidity control heat exchanger section cools the liquid absorbent in the humidity controller, the liquid absorbent absorbs moisture from the target air, and
a regeneration passage in which,
while the regeneration heat exchanger section cools the liquid absorbent in the regenerator, the liquid absorbent absorbs moisture from the regeneration air, and
while the regeneration heat exchanger section heats the liquid absorbent in the regenerator, moisture is released from the liquid absorbent to the regeneration air, and
the circuit selector switches the absorbent circuit between
a humidity-controlled position in which during the humidity control operation, the liquid absorbent circulates between the humidity control passage and the regeneration passage, and
a regenerated position in which during the regeneration operation during which the humidity control operation is stopped, both ends of the regeneration passage communicate with each other, and the liquid absorbent circulates within the regeneration passage to allow only regeneration of the liquid absorbent.

3. The humidity control apparatus of claim 2 further comprising:
a concentration detector configured to detect a concentration of the liquid absorbent when the absorbent circuit is in a regenerated position, wherein
the controller is programmed to stop the regeneration operation based on a value detected by the concentration detector.

4. The humidity control apparatus of claim 2 further comprising:
a moisture amount detector configured to detect a total amount of moisture released from or absorbed by the liquid absorbent in the regenerator when the circuit selector is in a regenerated position, wherein
the controller is programmed to stop the regeneration operation based on a value detected by the moisture amount detector.

5. The humidity control apparatus of claim 1, wherein
the absorbent circuit includes,
a humidity control passage in which, while moisture is released from the liquid absorbent to the target air in the humidity controller, the liquid absorbent absorbs moisture from the target air in the humidity controller,
a regeneration passage in which,
while the regeneration heat exchanger section cools the liquid absorbent in the regenerator, the liquid absorbent absorbs moisture from the regeneration air, and
while the regeneration heat exchanger section heats the liquid absorbent in the regenerator, moisture is released from the liquid absorbent to the regeneration air, and
a liquid tank configured to store the liquid absorbent, and
the circuit selector switches the absorbent circuit between
a humidity-controlled position in which, during the humidity control operation, the liquid absorbent circulates between the humidity control passage and the liquid tank, and
a regenerated position in which, during the regeneration operation during which the humidity control operation is stopped, the liquid absorbent circulates between the regeneration passage and the liquid tank to allow only regeneration of the liquid absorbent.

6. The humidity control apparatus of claim 5, wherein the humidity control passage is configured such that,
   while the humidity control heat exchanger section heats the liquid absorbent in the humidity controller, moisture is released from the liquid absorbent to the target air, and
   while the humidity control heat exchanger section cools the liquid absorbent in the humidity controller, the liquid absorbent absorbs moisture from the target air, and
   the humidity-controlled position of the absorbent circuit includes,
      a first humidity-controlled position in which the liquid absorbent circulates between the humidity control passage and the regeneration passage, and the liquid absorbent is heated and cooled to perform the humidity control operation, and
      a second humidity-controlled position in which the liquid absorbent circulates between the humidity control passage and the liquid tank, and the humidity control operation is performed without heating or cooling the liquid absorbent.

7. The humidity control apparatus of claim 6, wherein the controller is programmed to allow the humidity control heat exchanger section and the regeneration heat exchanger section to stop exchanging heat in the second humidity-controlled position.

8. The humidity control apparatus of claim 5 further comprising:
   a concentration detector configured to detect a concentration of the liquid absorbent when the absorbent circuit is in a regenerated position, wherein
   the controller is programmed to stop the regeneration operation based on a value detected by the concentration detector.

9. The humidity control apparatus of claim 5 further comprising:
   a moisture amount detector configured to detect a total amount of moisture released from or absorbed by the liquid absorbent in the regenerator when the circuit selector is in a regenerated position, wherein
   the controller is programmed to stop the regeneration operation based on a value detected by the moisture amount detector.

10. The humidity control apparatus of claim 1, wherein the regeneration passage includes a liquid tank configured to store the liquid absorbent.

11. The humidity control apparatus of claim 10, wherein the regeneration passage includes a bypass passage used to bypass the liquid tank.

12. The humidity control apparatus of claim 11 further comprising:
   a tank selector that is selectable between a tank utilization position in which the bypass passage is closed, and the liquid tank is opened, and a bypass position in which the bypass passage is opened, and the liquid tank is closed;
   a feeder configured to feed heat source fluid exchanging heat with the liquid absorbent to the humidity control heat exchanger section; and
   an adjuster configured to adjust a capacity of the feeder, the adjuster increasing an amount of the heat source fluid fed in a situation where a humidity control capacity of the humidity controller is not high enough to correspond to a humidity control load, and decreasing the amount of the heat source fluid fed in a situation where the humidity control capacity of the humidity controller is excessively high for the humidity control load, wherein
   the controller is programmed to switch the tank selector from the bypass position to the tank utilization position in a situation where the capacity of the feeder is greater than or equal to a first value, and switch the tank selector from the tank utilization position to the bypass position in a situation where the capacity of the feeder is less than or equal to a second value less than the first value.

13. The humidity control apparatus of claim 10 further comprising:
   a concentration detector configured to detect a concentration of the liquid absorbent when the absorbent circuit is in a regenerated position, wherein
   the controller is programmed to stop the regeneration operation based on a value detected by the concentration detector.

14. The humidity control apparatus of claim 13, wherein the concentration detector detects the concentration of the liquid absorbent based on a level of the liquid absorbent in the liquid tank.

15. The humidity control apparatus of claim 10 further comprising:
   a moisture amount detector configured to detect a total amount of moisture released from or absorbed by the liquid absorbent in the regenerator when the circuit selector is in a regenerated position, wherein
   the controller is programmed to stop the regeneration operation based on a value detected by the moisture amount detector.

16. The humidity control apparatus of claim 1, wherein the humidity control apparatus further includes a fan configured to deliver air to both of the regenerator and the auxiliary heat exchanger section.

17. The humidity control apparatus of claim 1 further comprising:
   a moisture amount detector configured to detect a total amount of moisture released from or absorbed by the liquid absorbent in the regenerator when the circuit selector is in a regenerated position, wherein
   the controller is programmed to stop the regeneration operation based on a value detected by the moisture amount detector.

18. The humidity control apparatus of claim 1 further comprising:
   a concentration detector configured to detect a concentration of the liquid absorbent when the absorbent circuit is in a regenerated position, wherein
   the controller is programmed to stop the regeneration operation based on a value detected by the concentration detector.

* * * * *